(12) United States Patent
Doufas et al.

(10) Patent No.: US 12,371,556 B2
(45) Date of Patent: Jul. 29, 2025

(54) AUTOMOTIVE WEATHER SEALS FORMED WITH THERMOPLASTIC VULCANIZATE COMPOSITIONS

(71) Applicant: Celanese International Corporation, Irving, TX (US)

(72) Inventors: Antonios K. Doufas, Houston, TX (US); Krishnan Anantha Narayana Iyer, Manvel, TX (US); Khodabakhsh Irani, Houston, TX (US); Eric P. Jourdain, Rhode Saint Genese (BE)

(73) Assignee: Celanese International Corporation, Irving, TX (US)

( * ) Notice: Subject to any disclaimer, the term of this patent is extended or adjusted under 35 U.S.C. 154(b) by 566 days.

(21) Appl. No.: 17/601,606

(22) PCT Filed: Jun. 12, 2020

(86) PCT No.: PCT/US2020/037476
§ 371 (c)(1),
(2) Date: Oct. 5, 2021

(87) PCT Pub. No.: WO2020/252293
PCT Pub. Date: Dec. 17, 2020

(65) Prior Publication Data
US 2022/0177684 A1   Jun. 9, 2022

Related U.S. Application Data

(60) Provisional application No. 62/860,897, filed on Jun. 13, 2019.

(51) Int. Cl.
*C08L 23/16* (2006.01)
*C08J 9/00* (2006.01)

(52) U.S. Cl.
CPC .......... *C08L 23/16* (2013.01); *C08L 2205/22* (2013.01)

(58) Field of Classification Search
CPC ...... C08L 23/16; C08L 2205/22; C08L 61/06; C08J 9/32; C08J 9/0061; C08J 2203/022; C08J 2323/16; C08J 2423/12; C08K 3/04; C08K 3/346; C08K 3/22
See application file for complete search history.

(56) References Cited

U.S. PATENT DOCUMENTS

| | | | |
|---|---|---|---|
| 3,615,972 A | 10/1971 | Morehouse, Jr. et al. | |
| 4,130,535 A | 12/1978 | Coran et al. | |
| 4,483,889 A | 11/1984 | Andersson | |
| 6,221,964 B1 | 4/2001 | Brzoskowski et al. | |
| 6,268,438 B1 | 7/2001 | Ellul et al. | |
| 6,407,174 B1 | 6/2002 | Ouhadi | |
| 6,433,090 B1 | 8/2002 | Ellul et al. | |
| 6,451,865 B1 | 9/2002 | Migchels et al. | |
| 6,503,985 B1 | 1/2003 | Ellul et al. | |
| 6,582,633 B2 | 6/2003 | Elfving et al. | |
| 6,720,361 B2 | 4/2004 | Tasaka et al. | |
| 6,750,292 B2 | 6/2004 | Dozeman et al. | |
| 6,939,918 B2 | 9/2005 | Ellul et al. | |
| 7,319,121 B2 | 1/2008 | Jacob | |
| 7,390,850 B2 | 6/2008 | Cook et al. | |
| 7,504,458 B2 | 3/2009 | Abraham et al. | |
| 7,851,556 B2 | 12/2010 | Abraham et al. | |
| 8,338,543 B2 | 12/2012 | Moscardi et al. | |
| 10,508,184 B2 | 12/2019 | Shannon et al. | |
| 2004/0242779 A1 | 12/2004 | Cai et al. | |
| 2007/0021564 A1 | 1/2007 | Ellul et al. | |
| 2007/0254971 A1* | 11/2007 | De Vogel | B29C 70/66 521/59 |
| 2008/0076879 A1 | 3/2008 | Resendes et al. | |
| 2009/0270545 A1 | 10/2009 | Sahnoune et al. | |
| 2010/0324161 A1 | 12/2010 | Ellul et al. | |
| 2011/0028637 A1 | 2/2011 | Ellul et al. | |
| 2013/0055644 A1 | 3/2013 | Baratin et al. | |
| 2013/0180179 A1 | 7/2013 | Baratin et al. | |

(Continued)

FOREIGN PATENT DOCUMENTS

| EP | 0143761 | 3/1988 |
|---|---|---|
| EP | 0889090 | 1/1999 |

(Continued)

OTHER PUBLICATIONS

Bhattacharjee, et al., "Tailoring Polymer Molecular Structure in the EPDM Slurry Process", Rubber Chemistry and Technology, vol. 76, pp. 1057-1073 (2003).

(Continued)

*Primary Examiner* — K. Boyle

(74) *Attorney, Agent, or Firm* — Dority & Manning, P.A.

(57) ABSTRACT

Profiles or articles such as automotive seals (e.g., door seals and trunk seals) formed with foamed TPVs can comprise a thermoplastic polyolefin (e.g., polypropylene) and an ethylene-a-olefin-diene terpolymer, which imparts improved elastic properties. The sealing profile can comprise a foamed thermoplastic vulcanizate composition comprising a thermoplastic polyolefin and an ethylene-a-olefin-diene terpolymer elastomer, wherein the ethylene-a-olefin-diene terpolymer elastomer has a weight-average molecular weight Mw of from 200,000 g/mol to 3,000,000 g/mol, a Mw/Mn of 4.0 or lower, and a $g'_{vis}$ of 0.90 or greater, wherein the foamed thermoplastic vulcanizate composition has a specific gravity of 0.2 to 0.9.

25 Claims, No Drawings

(56) References Cited

U.S. PATENT DOCUMENTS

| | | |
|---|---|---|
| 2013/0316111 A1 | 11/2013 | Wu et al. |
| 2018/0030219 A1 | 2/2018 | Chung et al. |
| 2018/0141421 A1 | 5/2018 | Blottiau |
| 2019/0322831 A1 | 10/2019 | Chung et al. |

FOREIGN PATENT DOCUMENTS

| | | | |
|---|---|---|---|
| EP | 0892831 | 5/2000 | |
| EP | 1263872 | 9/2004 | |
| EP | 1534772 | 12/2011 | |
| WO | 2004/016679 | 2/2004 | |
| WO | 2007/044123 | 4/2007 | |
| WO | 2013/062685 | 5/2013 | |
| WO | WO-2019199486 A1 * | 10/2019 | .............. C08L 23/16 |

OTHER PUBLICATIONS

Ravishankar et al., "Recent advances in EPDM and dynamically vulcanized thermoplastic elastomers", Rubber World, vol. 252, pp. 1-4 (2015).

\* cited by examiner

AUTOMOTIVE WEATHER SEALS FORMED WITH THERMOPLASTIC VULCANIZATE COMPOSITIONS

CROSS REFERENCE TO RELATED APPLICATIONS

This application is a U.S. national phase application of PCT Application No. PCT/US2020/037476 having a filing date of Jun. 12, 2020, which claims priority to and the benefit of U.S. Provisional Application Ser. No. 62/860,897, filed Jun. 13, 2019, the disclosures of each are hereby incorporated by reference in their entirety.

FIELD

The present disclosure relates to compositions useful as automotive seals (e.g., primary and secondary body seals such as body seals, trunk lid seals, door-to-door seals, rocker seals, and hood seals) formed with thermoplastic vulcanizates having improved elastic properties.

BACKGROUND

Thermoplastic vulcanizates (TPVs) comprise finely-divided rubber particles dispersed within a thermoplastic matrix. These rubber particles are advantageously crosslinked to promote elasticity. The dispersed rubber phase is typically referred to as the discontinuous phase, and the thermoplastic phase is referred to as the continuous phase. Such TPVs are well known and may be prepared by dynamic vulcanization, which is a process whereby a rubber is cured or vulcanized using a curative agent within a blend with at least one thermoplastic polymer while the polymers are undergoing mixing or masticating at some elevated temperature, preferably above the melt temperature of the thermoplastic polymer. For example, U.S. Pat. No. 4,130,535 discloses thermoplastic vulcanizates comprising blends of a polyolefin resin and completely cured olefin copolymer rubber. TPVs thus have the benefit of the elastomeric properties provided by the elastomer phase, with the processability of thermoplastics.

Automotive equipment manufacturers and suppliers are increasingly utilizing thermoplastic vulcanizates (TPVs) for automotive weather seals instead of ethylene-propylene-diene (EPDM) rubber or other thermoset compounds. Some reasons for the increased utilization of TPVs include advantages in processability and recyclability. Lips are a portion of the weather seal structure with highly demanding requirements for elasticity and resiliency. For example, the lip should immediately retract back to its original position upon deflection when touching the glass at temperatures up to about 90° C.

The olefin terpolymer rubber may include ethylene-a-olefin-diene rubber, preferably EPDM rubber, which is generally formed by the polymerization of monomers, typically comprising two olefins, generally ethylene and propylene, and a lesser quantity of a non-conjugated diene monomer such as 5-ethylidene-2-norbornene (ENB), 5-vinyl-2-norbornene (VNB), 1,4-hexadiene, 1,6-octadiene, 5-methyl-1,4-hexadiene, and 3,7-dimethyl-1,6-octadiene. EPDM elastomers are generally polymers of very high molecular weight (as measured by their Mooney viscosity), and are often suitable for use in TPV applications. In TPV compositions having an EPDM polymer that is cured less than about 90%, compression set and elastic properties are generally unacceptably high for many applications, especially at elevated temperatures. In addition, the thermoplastic matrix tends to decrease resistance to compression set at lower temperatures. Some attempts have been made to improve this resistance to compression set. For example, various rubber processing oils have been added.

EPDM's containing ENB which is a non-conjugated diene having two polymerizable double bonds are well-known. Such terpolymers can be produced via conventional Zeigler-Natta polymerization using vanadium catalyst with solution polymerization. High molecular weight (MW) EPDMs produced via conventional solution polymerization contain significantly high amounts of long chain branching (LCB). High levels of LCB can improve processability, but the effect on physical properties of the final EPDM product is not well understood. In the traditional solution process, ENB can be used to induce LCB in a post polymerization reaction via cationic crosslinking. On the other hand, slurry polymerization is well-known in the art for producing ultra-high MW polymers with relatively controlled MW distribution and long chain branching. The degree of LCB in EPDM can also be tailored in slurry polymerization by using carefully designed catalyst and process systems. In comparison to solution polymerization that typically runs at a 5 wt % to 10 wt % solids level, slurry process is known to improve the production rate of polymerization plants by allowing higher solids levels of 20 wt % to 30 wt % without any limitation of solution viscosity. S. Bhattacharjee, H. Bender and D. Padliya, "Tailoring polymer molecular structure in the EPDM slurry process", Rubber Chemistry and Technology, Vol. 76, pp. 1057-1073 (2003).

TPVs produced by employing high Mw EPDMs produced via solution polymerization typically exhibit inferior elastic properties relative to EPDM thermoset compounds due to the limitation of EPDM, namely a high degree of LCB, and the existence of the plastic phase, typically polyolefin based thermoplastic. In addition to the elastic properties (low compression set, tension set, and high resiliency), the TPVs should maintain a balance of other mechanical properties including hardness, tensile properties (e.g., tensile strength, modulus, elongation to break) as well as extrusion performance including processability and part surface appearance (e.g., smoothness, no edge tear, no surface spots, no die lines, no Rococo). Current combinations of EPDMs and thermoplastic polyolefins employed have proved to be inadequate for this purpose.

Automotive equipment manufacturers and suppliers using TPVs in automotive seals typically utilize a foamed TPV. In such instances, TPVs can be used as a foaming material by incorporating a modifier or filler or other components. Endothermic and exothermic chemical or physical foaming agents are blended to the thermoplastic base material. For example, WO/2004/016679A2 describes soft thermoplastic vulcanizate foams comprising a polyolefin thermoplastic resin, an at least partially crosslinked olefinic elastomer, a hydrogenated styrenic block copolymer, and optional additives. The soft foams have smooth surfaces, relatively low water absorption, and improved compression set and compression load deflection. WO/2007/0044123A1 describes a thermoplastic vulcanizate that can be foamed by employing supercritical foaming methods, including at least one cured rubber component, at least one conventional thermoplastic resin, at least one random polypropylene copolymer, and at least one thermoplastic elastomer styrenic block copolymer.

Automobile manufacturers are continually looking for ways to improve fuel economy of automobiles. Light weighting of the components used to construct automobiles through foaming has become extremely attractive for achieving this goal. A commonly used method for reducing the weight of automotive weatherstrip formulations involves the use of foaming agents. The addition of foaming agents produces porosity in the cross section of the weatherstrip, thus providing a potentially dramatic savings in weight.

Conventional dense thermoplastic elastomers, TPV and SEBS materials typically have high density in the range of 0.90 g/cm$^3$ to 1.10 g/cm$^3$ and are frequently blown using foaming agents to a density of 0.70 g/cm$^3$ to 0.80 g/cm$^3$ for sealing applications. However, conventional thermoplastic elastomer foams have not always been competitive because they suffer from relatively high compression set and high compression load deflection. Dense thermoset EPDM formulations tend to show higher densities in the range of 1.10 g/cm$^3$ to 1.30 g/cm$^3$ and are blown using foaming agents to 0.80 g/cm$^3$ to 1.10 g/cm$^3$ for microdense applications. Although thermoset EPDM foams exhibit good elastic recovery, they are relatively high in cost and result in seals of relatively high densities that do not offer significant vehicular weight savings.

There is a need to develop a TPV composition, especially foamed TPV compositions, with superior balance of elastic properties in combination with mechanical properties as well as excellent part surface appearance and extruder processability.

SUMMARY

The present disclosure relates to automotive seals (e.g., door seals and trunk seals) formed with foamed TPVs comprising a thermoplastic polyolefin (e.g., polypropylene) and an ethylene-a-olefin-diene terpolymer, which imparts improved elastic properties.

For example, a sealing profile can comprise: a foamed thermoplastic vulcanizate composition comprising a thermoplastic polyolefin (e.g., polypropylene) and an ethylene-a-olefin-diene terpolymer elastomer (e.g., EPDM), wherein the ethylene-a-olefin-diene terpolymer elastomer has a weight-average molecular weight Mw of from 200,000 g/mol to 3,000,000 g/mol, a Mw/Mn of 4.0 or lower, and a g'$_{vis}$ of 0.90 or greater, wherein the foamed thermoplastic vulcanizate composition has a specific gravity of 0.2 to 0.9.

A method for preparation of such a sealing profile can comprise: blending the thermoplastic vulcanizate with a thermo-expandable microsphere foaming agent; and extruding the blended thermoplastic vulcanizate and the thermo-expandable microsphere foaming agent at an extrusion temperature to form the foamed thermoplastic vulcanizate composition.

Alternatively, a method for preparation of such a sealing profile can comprise: injecting the thermoplastic vulcanizate with a supercritical gas to form a mixture; and injection molding the mixture to form the sealing profile.

Either preparation method can be extruded and foamed by a robotic extrusion process.

Any of such sealine profiles or articles may be shaped to serve as a window seal, primary door seal, a secondary door seal, a body seal, a door panel, a trunk seal, a rocker seal, or a hood seal.

DETAILED DESCRIPTION

The present disclosure relates to automotive seals (e.g., door seals and trunk seals) formed with foamed TPVs comprising a thermoplastic polyolefin (e.g., polypropylene) and an ethylene-a-olefin-diene terpolymer (e.g., EPDM) elastomer. Such automotive seals may have improved elastic properties and weatherability properties like low water absorption. That is, this disclosure provides for improved thermoplastic vulcanizate compositions with excellent elastic recovery and fabricability/processability to be particularly suitable for shaped, foamed articles, and as shaped, foamed components as part of composite structures.

More specifically, the present invention provides a foamed, extruded, and shaped article having a closed cell structure with smooth surface and a density of between 0.3 g/cm$^3$ and 0.9 g/cm$^3$ and with good sealability over the temperature range of about −40° C. to 100° C. The foamable thermoplastic vulcanizate compositions described herein have a dispersed, crosslinked rubber phase in a continuous thermoplastic polyolefin matrix phase. The crosslinked rubber phase can comprise an ethylene-a-olefin-diene terpolymer characterized by having a weight average molecular weight from about 500,000 g/mol to 3,000,000 g/mol, a polydispersity index of 4.0 or lower, and a g's, of 0.90 or greater optionally oil-extended by 50 phr to 200 phr processing oil, where "phr" means parts per hundred parts rubber. As used herein, the ethylene-a-olefin-diene terpolymer elastomer (also simply referred to herein as a ethylene-a-olefin-diene terpolymer) is considered the rubber to which the phr refers.

These foamed thermoplastic vulcanizate compositions advantageously demonstrate many of the properties of foamed thermoset elastomers while retaining the processability advantages of thermoplastics materials. For example, the foamed thermoplastic vulcanizate compositions exhibit superior elastic properties (low tension and compression sets, high stress relaxation) at similar or higher hardness and tensile properties (tensile strength, modulus, and elongation to break) when compared to similar foamed TPVs produced using high MW EPDMs obtained via solution polymerization with a g'$_{vis}$ less than 0.9, Δδ less than 30 degrees, and a long chain branching (LCB) index greater than 3. Moreover, the thermoplastic vulcanizate compositions have superior surface appearance and extrusion characteristics.

The foamed thermoplastic vulcanizates of the present disclosure include a rubber phase such as an ethylene-a-olefin-diene terpolymer (e.g., EPDM) and a thermoplastic matrix or phase (such as a propylene-based thermoplastic polymer, ethylene-based thermoplastic polymer, or a butene-1-based thermoplastic polymer). The foamed thermoplastic vulcanizates may also include other constituents that may be employed in the art of making thermoplastic vulcanizates. For example, the thermoplastic phase may include ethylene based polymers such as polyethylene or a propylene-based polymer such as polypropylene or a mixture thereof.

The present disclosure also provides a method for the fabrication of shaped, foamed automotive seals made by using standard thermoplastic elastomer processing techniques like extrusion, calendaring, and molding (e.g., injection or compression or blow molding). Also disclosed is a method of robotic extrusion, wherein an automatic handling unit or robot extrudes thermoplastic polymer onto articles.

Various terms as used herein are defined below. To the extent a term used in a claim is not defined below, it should be given the broadest definition persons in the pertinent art have given that term as reflected in one or more printed publications or issued patents.

The terms "foam" or "foam composition," and grammatical variants thereof, as used herein, refers to a durable structure having a density of less than 0.9 grams per cubic centimeter (g/cm$^3$) and having a primarily closed cell content (greater than at least 50%, and in some embodiments greater than at least 80% or 90%).

The term "thermoplastic vulcanizate," and grammatical variants thereof, including "thermoplastic vulcanizate composition," "thermoplastic vulcanizate material," or "TPV," and the like, is broadly defined as any material that includes a dispersed, at least partially vulcanized, rubber component and a thermoplastic component (e.g., a polyolefinic thermoplastic resin). A TPV material can further include other ingredients, other additives, or combinations thereof. Examples of commercially available TPV material include SANTOPRENE™ thermoplastic vulcanizates available from ExxonMobil Chemical, Houston, Texas.

The term "vulcanizate," and grammatical variants thereof, means a composition that includes some component (e.g., rubber) that has been vulcanized. The term "vulcanized," and grammatical variants thereof, is defined herein in its broadest sense, as reflected in any issued patent, printed publication, or dictionary, and refers in general to the state of a composition after all or a portion of the composition (e.g., a crosslinkable rubber) has been subjected to some degree or amount of vulcanization. Accordingly, the term encompasses both partial and total vulcanization. A preferred type of vulcanization is "dynamic vulcanization," discussed below, which also produces a "vulcanizate." Also, in at least one specific embodiment, the term vulcanized refers to more than insubstantial vulcanization (e.g., curing (or crosslinking)) that results in a measurable change in pertinent properties (e.g., a change in the melt flow index (MFI) of the composition by 10% or more, according to any ASTM-1238 procedure). In at least one or more contexts, the term vulcanization encompasses any form of curing (or crosslinking), both thermal and chemical, that can be utilized in dynamic vulcanization.

The term "dynamic vulcanization," and grammatical variants thereof, means vulcanization or curing of a curable rubber component blended with a thermoplastic component under conditions of shear at temperatures sufficient to plasticize the mixture. In at least one embodiment, the rubber component is simultaneously crosslinked and dispersed as micro-sized particles within the thermoplastic component. Depending on the degree of cure, the rubber component to thermoplastic component ratio, compatibility of the rubber component and thermoplastic component, the kneader type and the intensity of mixing (shear rate), other morphologies, such as co-continuous rubber phases in the plastic matrix, are possible.

The term "partially vulcanized," and grammatical variants thereof (e.g., "at least partially vulcanized"), with reference to a rubber component is one wherein more than 5 weight percent (wt. %) of the rubber component (e.g., crosslinkable rubber component) is extractable in boiling xylene, subsequent to vulcanization, preferably dynamic vulcanization (e.g., crosslinking of the rubber phase of the thermoplastic vulcanizate). For example, at least 5 wt % and less than 20 wt % or 30 wt % or 50 wt % of the rubber component can be extractable from the specimen of the thermoplastic vulcanizate in boiling xylene, encompassing any value and subset therebetween. The percentage of extractable rubber component can be determined by the technique set forth in U.S. Pat. No. 4,311,628, which is hereby incorporated by reference in its entirety.

As used herein, the "thermoplastic component," and grammatical variants thereof, of the thermoplastic vulcanizates of the present disclosure refers to any material that is not a "rubber" and that is a polymer or polymer blend considered by persons skilled in the art as being thermoplastic in nature (e.g., a polymer that softens when exposed to heat and returns to its original condition when cooled to room temperature). The thermoplastic component may comprise one or more polyolefins, including polyolefin homopolymers and polyolefin copolymers. In one or more embodiments, the polyolefinic thermoplastic component comprises at least one of i) a polymer prepared from olefin monomers having 2 to 7 carbon atoms and/or ii) copolymer prepared from olefin monomers having 2 to 7 carbon atoms with a (meth)acrylate or a vinyl acetate. Illustrative polyolefins can be prepared from mono-olefin monomers including, but not limited to, ethylene, propylene, 1-butene, isobutylene, 1-pentene. 1-hexene, 1-octene, 3-methyl-1-pentene, 4-methyl-1-pentene, 5-methyl-1-hexene, mixtures thereof and copolymers thereof with (meth)acrylates and/or vinyl acetates. In one or more preferred embodiments, the polyolefin thermoplastic component comprises polyethylene, polypropylene, ethylene-propylene copolymer, and any combination thereof. Preferably, the thermoplastic component is not vulcanized or not crosslinked.

As used herein, a "polymer" may be used to refer to homopolymers, copolymers, interpolymers, terpolymers, etc. When a polymer is referred to as comprising a monomer, the monomer is present in the polymer in the polymerized form of the monomer or in the derivative form of the monomer. Thus, when a polymer is said to comprise a certain percentage (e.g., wt %) of a monomer, that percentage of monomer is based on the total amount of monomer units in all the polymer components of the composition or blend. That is, a polymer comprising 30 wt % ethylene and 70 wt % propylene is a polymer where 30 wt % of the polymer is ethylene-derived units and 70 wt % of the polymer is propylene-derived units.

As used herein and except as stated otherwise, the term "copolymer," and grammatical variants thereof, refers to a polymer derived from two or more monomers (e.g., terpolymers, tetrapolymers, and the like).

For purposes of this disclosure, and unless otherwise indicated, a "composition" includes components of the composition and/or reaction products of two or more components of the composition.

Rubber Phase

The rubbers that may be employed to form the rubber phase include those polymers that are capable of being cured or crosslinked by a phenolic resin or a hydrosilylation curative (e.g., silane-containing curative), a peroxide with a co-agent, a moisture cure via silane grafting, or an azide. Reference to a rubber may include mixtures of more than one rubber. The rubbers used in the compositions and methods of the present disclosure are ethylene-a-olefin-diene terpolymers.

The terms "ethylene-a-olefin-diene terpolymers," "ethylene-a-olefin-diene terpolymer rubbers," and "ethylene-a-olefin-diene rubbers" are used interchangeably and refer to rubbery terpolymers polymerized from ethylene, at least one other α-olefin monomer, and at least one diene monomer (for example, an EPDM terpolymer).

The α-olefins may be a $C_2$ to $C_{40}$, such as $C_3$ to $C_{20}$, such as $C_3$ to $C_{10}$ olefins. Examples of such α-olefins can include, but are not limited to, propylene, 1-butene, 1-hexene, 4-methyl-1-pentene, 1-octene, 1-decene, and the like, and any combination thereof.

The diene monomers may include 5-ethylidene-2-norbornene; 5-vinyl-2-norbornene; divinylbenzene: 1,4-hexadiene: 5-methylene-2-norbornene: 1,6-octadiene; 5-methyl-1, 4-hexadiene: 3,7-dimethyl-1,6-octadiene: 1,3-cyclopentadiene; 1,4-cyclohexadiene; dicyclopentadiene; and the like; and any combination thereof.

The ethylene-a-olefin-diene terpolymer rubbers described herein include one or more of the following characteristics (1)-(14), where measurement techniques of each are described in detail below.

(1) An ethylene-derived content that is from about 50 wt % to about 70 wt % (such as from about 55 wt % to about 65 wt %, such as from about 60 wt % and about 65 wt %) based on the total weight of the ethylene-a-olefin-diene terpolymer.

(2) A diene-derived content that is from about 4 wt % to about 12 wt % (such as from about 4 wt % to about 9 wt %) based on the total weight of the ethylene-a-olefin-diene terpolymer rubber.

(3) The balance of the ethylene-a-olefin-diene terpolymer rubber is the α-olefin-derived content.

(4) A weight average molecular weight (Mw) that is about 500,000 g/mol to about 3,000,000 g/mol (such as about 500,000 g/mol to about 2,000,000, such as about 500,000 g/mol to about 1,500,000 g/mol, such as about 600,000 g/mol to about 1,200,000 g/mol, such as about 600,000 g/mol to about 1,000,000 g/mol).

(5) A number average molecular weight (Mn) that is about 20,000 g/mol to about 500,000 g/mol (such as about 60,000 g/mol to about 400,000 g/mol, such as about 100,000 g/mol to about 300,000 g/mol, such as about 150,000 g/mol to about 500,000 g/mol).

(6) A Z-average molecular weight (Mz) that is about 10,000 g/mol to about 7,000,000 g/mol (such as about 50,000 g/mol to about 3,000,000 g/mol, such as about 70,000 g/mol to about 2,000,000 g/mol, such as about 75,000 g/mol to about 1,500,000 g/mol, such as about 80,000 g/mol to about 700,000 g/mol, such as about 100,000 g/mol to about 500,000 g/mol).

(7) A polydispersity index (Mw/Mn; PDI) that is about 4.0 or lower (such as about 1 to about 4, such as about 2 to about 4, such as about 1 to about 3, such as about 1.8 to about 3, such as about 1 to about 2, such as about 1 and 2.5).

(8) A dry Mooney viscosity ($ML_{(1+4)}$ at 125° C.) per ASTM D1646-17, that is about 100 MU or greater (such as about 250 MU to about 500 MU, such as about 250 MU to about 450 MU, such as about 350 MU to 50) MU).

(9) A $g'_{vis}$ that is about 0.90 or more (such as about 0.90 to about 1, such as about 0.92 to about 0.99, such as about 0.95 to about 0.98).

(10) A Δδ that is about 30° or more (such as about 30° to about 80°, such as about 35° to about 70°, such as about 40 to about 60°), where Δδ=δ (0.1 rad/s, 125° C.)−δ (128 rad/s, 125° C.).

(11) A glass transition temperature ($T_g$), as determined by differential scanning calorimetry (DSC) according to ASTM E1356-08(2014), that is about −20'C or less (such as −20° C. to about −60° C., such as about −30'C to about −60° C., such as about −50° C. to about −60° C.).

(12) A large amplitude oscillatory shear (LAOS) branching index of less than 4 (such as −2 to 4, such as −1.5 to 4, such −1 to 2.0, such 0 to 1.5).

The ethylene-a-olefin-diene terpolymer rubbers, and preferably ethylene-propylene-diene terpolymer rubbers, may be manufactured or synthesized by using a variety of techniques. For example, these terpolymers can be synthesized by employing solution, slurry, or gas phase polymerization techniques or combination thereof that employ various catalyst systems including Ziegler-Natta systems including vanadium catalysts and take place in various phases such as solution, slurry, or gas phase. Exemplary catalysts include single-site catalysts including constrained geometry catalysts involving Group IV-VI metallocenes. For example, the EPDMs can be produced via conventional Zeigler-Natta catalysts using a slurry process, especially those including vanadium compounds, as disclosed in U.S. Pat. No. 5,783,645, as well as metallocene catalysts, which are also disclosed in U.S. Pat. No. 5,756,416, each of which are incorporated herein by reference. Other catalysts systems such as the Brookhart catalyst system may also be employed. Optionally, such EPDMs can be prepared using the above catalyst systems in a solution process.

Ethylene-propylene-diene terpolymer rubbers are commercially available under the tradenames VISTALON™ (ExxonMobil Chemical Co.; Houston, Tex.), KELTAN™ (Arlanxeo Performance Elastomers; Orange, TX.), NORDEL™ IP (Dow), NORDEL MG™ (Dow), ROYALENE™ (Lion Elastomers), and SUPRENE™ (SK Global Chemical). Specific examples include VISTALON™ 3666, KELTAN™ 5469 Q, KELTAN™ 4969 Q, KELTAN™ 5469 C, KELTAN™ 4869 C, ROYALENE™ 694, ROYALENE™ 677, SUPRENE™ 512F, and NORDEL™ 6555.

Table 1 shows the characteristics of selected elastomeric terpolymers.

TABLE 1

Characteristics of Rubbers Used in Selected TPV Compositions

| Grade | wt % C2 | wt % ENB | Oil (phr) | Mw (g/mol) | Mz (g/mol) | Mw/Mn | LCB-$g'_{vis}$ | BI (LAOS) | Δδ (SAOS) |
|---|---|---|---|---|---|---|---|---|---|
| VISTALON ™ 3666 | 64 | 4.2 | 75 | 460,000 | 509,000 | 4.0 | 0.867 | 3.8 | 26.5 |
| KELTAN ™ 5469Q | 61 | 4 | 100 | 600,000 | 1,064,000 | 2.5 | 1.000 | −0.5 | 39.3 |

LCB-$g'_{vis}$ was measured using GPC-4D.
BI (LAOS) was measured using APA rheometer at 125° C.
Δδ = Measured using APA rheometer at 125° C., defined as δ (@ 0.1 1/s) − δ (@ 128 1/s).

Techniques for determining the molecular properties are described below.

Optionally, the ethylene-a-olefin-diene terpolymer rubbers may be obtained in an oil extended form, with about a 50 phr to about 200 phr process oil (such as about 75 phr to about 120 phr process oil) on the basis of 100 phr of elastomer.

Styrenic Elastomers

In some embodiments, the inventive foamable TPV compositions contain elastomers such as SIS (styrene/isoprene/styrene copolymer elastomers) and SBS (styrene/butadiene/styrene triblock copolymer elastomers) rubber. These rubbers are styrenic triblock copolymers having a conjugated diene midblock based on butadiene or isoprene, and may be referred to herein collectively as unsaturated styrenic triblock copolymer rubbers.

Hydrogenated styrenic triblock copolymer elastomers, exemplified by SEBS (styrene/ethylene-butylene/styrene), SEPS (styrene/ethylene-propylene/styrene), and SEEPS (styrene/ethylene-ethylene-propylene/styrene) are widely commercially available and are described in further detail in U.S. Pat. App. Pub. No. 2004/0132907. As noted in the aforementioned reference, hydrogenated styrenic triblock copolymers may include crosslinkable styrenic blocks, which, in combination with the crosslinkable midblocks, may afford greater overall crosslinking of the cured elastomer within the TPV. These elastomers may have a styrene content as low as 10% by weight to as high as 50% by weight, preferably 20% and 40% by weight, and most preferably from 25% to 35% by weight. The molecular weight of the styrene component may be from 7,000 to 50,000, and the molecular weight of the elastomeric component may be from 30,000 to greater than 150,000. Methods of forming suitable hydrogenated styrenic triblock copolymer elastomers are well known in the art. See G. Holden and N. R. Legge, *Styrenic Thermoplastic Elastomers*, THERMOPLASTIC ELASTOMERS (eds. G. Holden, N. R. Legge, R. Quirk, and H. E. Schroeder, Hauser/Gardner Publications, Inc., Cincinnati, Ohio, 1996) Ch. 3. Exemplary example of elastomers include those available from Kraton Polymers such as KRATONX G 1650, a styrene-ethylene-butene-styrene (SEBS) block copolymer containing 30% styrene by weight and having a melt flow rate of less than about 0.1 g/10 min (ASTM D1238-01 (@ 200° C. 75.0 kg).

Propylene-Based Elastomer

The optional PBE, where employed, may be present in the TPV formulation (and/or in the resulting TPV composition) of some embodiments within the range from 3 wt % to 20 wt %, preferably from 4 wt % to 15 wt %, such as 4 wt % to 12 wt % or 5 wt % to 10 wt %, with ranges from any of the foregoing lows to any of the foregoing highs also contemplated in various embodiments. Although it is possible to blend (e.g., coextrude, melt-mix or the like) PBE with a vulcanized TPV material to form the resulting TPV, it is preferred that the PBE be present in the TPV formulation prior to dynamic vulcanization (that is, preferred TPVs are formed such that the PBE is present in the TPV formulation at the time of dynamic vulcanization, and preferred methods include dynamic vulcanization in the presence of the PBE).

Preferred PBEs are those in accordance with the propylene-based elastomer described in Paragraphs [0055] to [0075] of WIPO Pat. Pub. No. WO/2015/095987 having international filing date 24 Dec. 2013, which description is incorporated by reference herein. As set forth therein, the PBE preferably has reduced crystallinity and/or melting point as compared to highly isotactic polypropylene due to introduction of errors in the insertion of propylene. The PBE is generally devoid of any substantial intermolecular heterogeneity in tacticity and comonomer composition, and also generally devoid of any substantial heterogeneity in intramolecular composition distribution.

Particularly preferred PBEs in accordance with that description for use in embodiments of the present invention include copolymers of propylene and one or more comonomers selected from the group consisting of ethylene and C4-C10 α-olefins; most preferred are propylene-ethylene copolymers. The PBE has at least 60 wt % units derived from propylene (based on total mass of the PBE), such as within the range from a low of any one of 60 wt %, 65 wt %, 70 wt %. 75 wt %, 80 wt %. 84 wt %, and 85 wt % to a high of any one of 85 wt %, 90 wt %, 92 wt %, 94 wt %, and 95 wt %, provided the high end of the range is greater than the low end. The balance of the PBE is preferably derived from ethylene, although in some embodiments the PBE may include one or C4-C10 comonomers instead of, or in addition to, ethylene.

Preferred PBEs have one or more, preferably two or more or three or more, most preferably four or more, or all, of the following properties:

MFR of 1 to 20 g/10 min (ASTM D-1238, 230° C. and 2.16 kg). Most preferably, however. MFR of the PBE is within the range from 1 to 10, more preferably within the range from a low of 1 or 2 g/l0 min to a high of 4 or 5 g/10 min:

Melting point Tm as determined by DSC of 105° C. or less, such as within the range from 25° C., 60° C., 70° C., or 90° C. to 105° C.;

Heat of fusion (Hf) as determined by DSC of 80 J/g or less, such as within the range from a low of any one of 1, 3, 5, 6, and 7 J/g to a high of any one of 30, 35, 40, 45, 50, 60, 70, 75, and 80 J/g:

Triad tacticity of three propylene units, as measured by $^{13}$C NMR of at least 75%, such as within the range from 75, 80, 82, or 85% to 97% or 99%; and Density of 0.850 g/cc to 0.900 g/cc (measured at room temperature per ASTM D1505).

The DSC procedures for determining Tm and Hf include the following. The polymer is pressed at a temperature from 200° C. to 230° C. in a heated press, and the resulting polymer sheet is hung, under ambient conditions (of 20-23.5° C.), in the air to cool. 6 to 10 mg of the polymer sheet is removed with a punch die. This 6 to 10 mg sample is annealed at room temperature (22° C.) for 80 to 100 hours. At the end of this period, the sample is placed in a DSC (Perkin Elmer Pyris One Thermal Analysis System) and cooled at a rate of about 10° C./min to −30° C. to −50° C. and held for 10 minutes at −50° C. The sample is heated at 10° C./min to attain a final temperature of 200° C. The sample is kept at 200° C. for 5 minutes. Then a second cool-heat cycle is performed, using the same conditions described above. Events from both cycles, "first melt" and "second melt", respectively, are recorded. The thermal output is recorded as the area under the melting peak of the sample, which typically occurs between 0° C. and 200° C. It is measured in Joules and is a measure of the Hf of the polymer. Tm is the temperature of greatest heat absorption (i.e., the temperature corresponding to the highest peak) in the range of melting during the first melt cycle.

Some embodiments may include one or more different PBEs, i.e., propylene-based elastomers each having one or more different properties such as, for example, different comonomer or comonomer content. Such combinations of various propylene-based elastomers are all within the scope of the invention.

Examples of the propylene-based elastomers may be those available commercially under the trade names VISTAMAXX™ (ExxonMobil Chemical Company, Houston, Tex., USA), VERSIFY™ (The Dow Chemical Company, Midland, Mich., USA), certain grades of TAFMER™ XM or NOTIO™ (Mitsui Company, Japan), and certain grades of SOFTEL™ (Basell Polyolefins of the Netherlands).

Plastomer

Suitable plastomers, which may optionally be present in the thermoplastic component of a TPV composition and/or TPV formulation of some embodiments (and which furthermore may be included in, or used as, a carrier polymer of some embodiments) include copolymers of ethylene and one or more C3 to C10 α-olefins, and having density less than 0.915 g/cm³ (such as within the range from 0.85 to 0.915 g/cm³) and melt index (MI) between 0.10 and 20 dg/min (ASTM D-1238 at 190° C., 2.16 kg load). Plastomers can also be described as metallocene catalyzed copolymers of ethylene and higher α-olefin comonomers such as propylene, 1-butene, 1-hexene and 1-octene, and which contain enough of one or more of these comonomers to yield a density between 0.85 and 0.915 g/cm³. Melting point Tm of suitable plastomers is less than 110° C., preferably 100° C. or less, such as 95° C. or less (where Tm is determined in the same manner as indicated herein for PBEs). The trade name EXACT™ is being used by ExxonMobil for their metallocene polymerized ethylene copolymers. The trade name ENGAGE™ is being used by Dow Elastomers.

In some embodiments, the elastomer may comprise a single rubber or a blend of rubbers. Suitable rubbers according to the present invention may include conjugated diene rubbers, unsaturated styrenic triblock copolymer rubbers, hydrogenated styrenic triblock copolymer rubbers, and ethylene/α-olefin rubbers, including ethylene/α-olefin/non-conjugated diene rubber.

Thermoplastic Phase

Preferably, the thermoplastic phase includes a polymer that can flow above its melting temperature. The major component of the thermoplastic phase may be a polypropylene (such as a homopolymer, random copolymer, impact copolymer, and the like, or any combination thereof), a polyethylene, or a butene-1-based polymer. The thermoplastic phase may also include, as a minor constituent, an ethylene based polymer (e.g., polyethylene), a propylene-based polymer (e.g., polypropylene), a butene-1-based polymer, or any combination thereof.

Propylene-based polymers include those solid, generally high-molecular weight plastic resins that primarily comprise units deriving from the polymerization of propylene and have a propylene-derived content of at least about 75% (such as 75 wt % to 100 wt %, such as 90 wt % to 100 wt %, such as about 95 wt % to 100 wt %, such as about 97 wt % to 100 wt %) based on the total weight of the propylene-based polymer. These polymers may be homopolymers of propylene. Homopolymer polypropylene can comprise linear chains and/or chains with long chain branching.

For copolymers, the propylene-based polymers may also include units deriving from the polymerization of ethylene and/or α-olefins such as 1-butene, 1-hexene, 1-octene, 2-methyl-1-propene, 3-methyl-1-pentene, 4-methyl-1-pentene, 5-methyl-1-hexene, and the like, and any combination thereof. Specifically included are the reactor, impact, and random copolymers of propylene with ethylene or the higher α-olefins, described above, or with $C_{10}$-$C_{20}$ olefins.

The propylene-based polymer includes one or more of the following characteristics (1)-(9):

(1) The propylene-based polymers may include semicrystalline polymers. These polymers may be characterized by a crystallinity of at least 25 wt % or more (such as 25 wt % to 70 wt %, such as about 35 wt % to 60 wt %, such as about 50 wt % to 70 wt %). Crystallinity may be determined by dividing the heat of fusion (Hf) of a sample by the heat of fusion of a 100% crystalline polymer, which is assumed to be 209 joules/gram for polypropylene.

(2) A Hf that is about 52.3 J/g or more (such as 52.3 J/g to 170 J/g, such as about 75 J/g to 125 J/g, such as about 100 J/g to 150 J/g, such as about 140 J/g to 170 J/g).

(3) A weight average molecular weight (Mw) that is about 50,000 g/mol to about 2,000,000 g/mol (such as about 100,000 g/mol to about 1,000,000 g/mol, such as about 100,000 g/mol to about 600,000 g/mol, such as about 400,000 g/mol to about 800,000 g/mol) as measured by GPC with polystyrene standards.

(4) A number average molecular weight (Mn) that is about 25,000 g/mol to about 1,000,000 g/mol (such as about 50,000 g/mol to about 300,000 g/mol) as measured by GPC with polystyrene standards.

(5) A $g'_{vis}$ that is 1 or less (such as 0.3 to 1, such as 0.3 to 0.8, such as 0.3 to 0.6, such as 0.3 to 0.5).

(6) A melt mass flow rate (MFR) (ASTM D1238-13, 2.16 kg weight @ 230° C.) that is about 0.1 g/10 min or more (such as about 0.1 g/10 min to about 50 g/10 min, such as about 0.5 g/10 min to about 5 g/10 min, such as about 0.5 g/10 min to about 3 g/10 min).

(7) A melt temperature ($T_m$) that is from about 110° C. to about 170° C. (such as about 140° C. to about 168° C., such as about 160° C. to about 165° C.).

(8) A glass transition temperature ($T_g$) that is from about −50° C. to about 10° C. (such as about −30° C. to about 5° C., such as about −20° C. to about 2° C.).

(9) A crystallization temperature ($T_c$) that is about 75° C. or more (such as about 75° C. to about 130° C., such as about 95° C. to about 130° C., such as about 100° C. to about 130° C., such as about 105° C. to about 130° C.).

The propylene-based polymers may include a homopolymer of a high-crystallinity isotactic or syndiotactic polypropylene. This polypropylene can have a density of from about 0.89 to about 0.91 g/cm³, with the largely isotactic polypropylene having a density of from about 0.90 to about 0.91 g/cm³. Also, high and ultra-high molecular weight polypropylene that has a fractional melt flow rate can be employed. The polypropylene resins may be characterized by an MFR (ASTM D1238-13; 2.16 kg (@ 230° C.) that is about 10 dg/min or less (such as about 1.0 dg/min or less, such as about 0.5 dg/min or less).

The polypropylene may include a homopolymer, random copolymer, or impact copolymer polypropylene, or combination thereof. The polypropylene may be a high melt strength (HMS), long chain branched (LCB) homopolymer polypropylene.

The propylene-based polymers may be synthesized by using an appropriate polymerization technique known in the art such as the conventional Ziegler-Natta type polymerizations, and catalysis employing single-site organometallic catalysts including metallocene catalysts.

Examples of polypropylene useful for the thermoplastic vulcanizate compositions described herein include EXXONMOBIL™ PP5341 (available from ExxonMobil): Achieve™ PP6282NE1 (available from ExxonMobil) and/or polypropylene resins with broad molecular weight distribution as described in U.S. Pat. Nos. 9,453,093 and 9,464,178; and other polypropylene resins described in U.S. Pat. Appl. Pub. Nos. 2018/0016414 and 2018/0051160 (for example, PDH025, as shown in Table 2 below): WAYMAX™ MFX6 (available from Japan Polypropylene Corp.): BOREALIS DAPLOY™ WB140 (available from Borealis AG); and BRASKEM AMPLEO™ 1025MA and BRASKEM AMPLEO™ 1020GA (available from Braskem Ampleo). Table 2 shows the characteristics of selected propylene based polymers.

TABLE 2

Molecular Properties of Selected Polypropylenes

| Grade | Mw (g/mol) | Mw/Mn | LCB-$g'_{vis}$ |
|---|---|---|---|
| EXXONMOBIL ™ PP5341 | 562,000 | 7.5 | 1.000 |
| EXXONMOBIL ACHIEVE ™ PP6282NE1 | 389,000 | 5.3 | 0.900 |
| EXXONMOBIL ™ PDH025 | 540,000 | 16 | 0.857 |
| WAYMAX ™ MFX6 | 390,000 | 5.3 | 0.900 |
| BOREALIS DAPLOY ™ WB140 | 671,000 | 7.6 | 0.526 |
| BRASKEM AMPLEO ™ I025MA | 465,000 | 10.8 | 0.737 |

LCB-$g'_{vis}$ was measured using GPC-4D.

Ethylene based polymers suitable for use in the thermoplastic phase include those solid, generally high-molecular weight plastic resins that primarily comprise units deriving from the polymerization of ethylene such as at least 90 wt % (such as 90 wt % to 100 wt %, such as 95 wt % to 100 wt %, such as 99 wt % to 100 wt %) of the units of the ethylene based polymer derive from the polymerization of ethylene. The ethylene based polymers may be homopolymers of ethylene.

For copolymers, the ethylene based polymers may also include units deriving from the polymerization of α-olefins such as propylene, 1-butene, 1-hexene, 1-octene, 2-methyl-1-propene, 3-methyl-1-pentene. 4-methyl-1-pentene, 5-methyl-1-hexene, and the like, and any combination thereof.

The ethylene based polymers may include one or more of the following characteristics (1)-(2).

(1) A melt index (MI) (ASTM D1238-13, 2.16 kg @ 190° C.) that is from about 0.1 dg/min to about 1,000 dg/min (such as from about 1.0 dg/min to about 200 dg/min, such as from about 7.0 dg/min to about 20.0 dg/min).

(2) A melt temperature ($T_m$) that is about 140° C. to about 90° C. (such as about 135° C. to about 125° C., such as about 130° C. to about 120° C.).

The ethylene based polymers may be synthesized by using an appropriate polymerization technique known in the art such as the conventional Ziegler-Natta type polymerizations, and catalysis employing single-site organometallic catalysts including metallocene catalysts. Ethylene based polymers are commercially available. For example, polyethylene is commercially available under the tradename EXXONMOBIL™ polyethylene (ExxonMobil). Ethylene based copolymers are commercially available under the tradename EXXONMOBIL™ polyethylene (ExxonMobil), which include metallocene produced linear low density polyethylene including EXCEED™, ENABLE™, and EXCEED™ XP.

The polyethylene may be a low density, linear low density, or high density polyethylene. The polyethylene may be a high melt strength (HMS), long chain branched (LCB) homopolymer polyethylene.

Butene-1-based polymers may be included in the thermoplastic phase of the TPVs described herein. Generally, butene-1-based polymers include those solid, generally high-molecular weight isotactic butene-1 resins that primarily comprise units deriving from the polymerization of butene-1.

The butene-1-based polymers may be isotactic poly (butene-1) homopolymers. Alternatively, the butene-1-based copolymers comprising a comonomer such as ethylene, propylene, 1-butene, 1-hexene, 1-octene, 4-methyl-1-pentene, 2-methyl-1-propene, 3-methyl-1-pentene, 4-methyl-1-pentene, 5-methyl-hexene, and the like, and any combination thereof.

The butene-1-based polymers may include one or more of the following characteristics (1)-(4).

(1) At least 90 wt % or more of the units of the butene-1-based polymer derive from the polymerization of butene-1 (such as 90 wt % to 100 wt %, such as 95 wt % to 100 wt %, such as 98 wt % to 100 wt %, such as 99 wt % to 100 wt %). The butene-1-based polymers may be homopolymers of butene-1.

(2) A melt index (MI)(ASTM D1238-13, 2.16 kg (190° C.) that is about 0.1 dg/min to 800 dg/min (such as from about 0.3 dg/min to about 200 dg/min, such as from about 0.3 dg/min to about 4.0 dg/min).

(3) A melt temperature ($T_m$) that is from about 130° C. to about 110° C. (such as from about 125° C. to about 115° C., such as from about 125° C. to about 120° C.).

(4) A density, as determined according to ASTM D792-13, that is about 0.897 g/mL to about 0.920 g/mL (such as about 0.910 g/mL to about 0.920 g/mL).

The butene-1-based polymers may be synthesized by using an appropriate polymerization technique known in the art such as the conventional Ziegler-Natta type polymerizations, and catalysis employing single-site organometallic catalysts including metallocene catalysts. Butene-1-based polymers are commercially available. For example, isotactic poly(1-butene) is commercially available under the tradename KOATTRO™ POLYBUTENE RESINS™ or PB™ (LyondellBasell).

Other Constituents

The thermoplastic vulcanizate may include a polymeric processing additive. The processing additive may be a polymeric resin that has a very high melt flow index. These polymeric resins include both linear and branched polymers that have a melt flow rate that is about 500 dg/min or more, such as about 750 dg/min or more, such as about 1000 dg/min or more, such as about 1200 dg/min or more, such as about 1500 dg/min or more. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers. Thermoplastic vulcanizates that include similar processing additives are disclosed in U.S. Pat. No. 6,451,915, which is incorporated herein by reference for purpose of U.S. patent practice.

In addition to the ethylene-a-olefin-diene terpolymer rubbers, thermoplastic resins, and optional processing additives, the thermoplastic vulcanizates of the present disclosure may optionally include reinforcing and non-reinforcing fillers, compatibilizers, antioxidants, stabilizers, rubber processing oil, lubricants, antiblocking agents, anti-static agents, waxes, foaming agents, pigments, flame retardants, nucleating agents, and other processing aids known in the rubber compounding art. These additives can comprise up to about 50 weight percent of the total composition.

Fillers and extenders that can be utilized include conventional inorganics such as calcium carbonate, clays, silica, talc, titanium dioxide, carbon black, a nucleating agent, mica, wood flour, and the like, and any combination thereof, as well as inorganic and organic nanoscopic fillers.

The thermoplastic vulcanizates may include an oil, such as a mineral oil, a synthetic oil, and the like, or any combination thereof. These oils may also be referred to as plasticizers or extenders. Mineral oils may include aromatic, naphthenic, paraffinic, and isoparaffinic oils, synthetic oils, and the like, and any combination thereof. The mineral oils may be treated or untreated. Useful mineral oils can be obtained under the tradename SUNPAR™ (Sun Chemicals). Others are available under the name PARALUX™ (Chevron), and PARAMOUNT™ (Chevron). Other oils that may be used include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include α-olefinic synthetic oils, such as liquid polybutylene. Additive oils other than petroleum based oils can also be used, such as oils derived from coal tar and pine tar, as well as synthetic oils, e.g., polyolefin materials.

Examples of oils include base stocks. According to the American Petroleum Institute (API) classifications, base stocks are categorized into five groups based on their saturated hydrocarbon content, sulfur level, and viscosity index (Table 3). Lube base stocks are typically produced in large scale from non-renewable petroleum sources. Group I, II, and III base stocks are all derived from crude oil via extensive processing, such as solvent extraction, solvent or catalytic dewaxing, and hydroisomerization, hydrocracking and isodewaxing, isodewaxing and hydrofinishing ["New Lubes Plants Use State-of-the-Art Hydrodewaxing Technology" in Oil & Gas Journal, Sep. 1, 1997; Krishna et al., "Next Generation Isodewaxing and Hydrofinishing Technology for Production of High Quality Base Oils", 2002 NPRA Lubricants and Waxes Meeting, Nov. 14-15, 2002: Gedeon and Yenni, "Use of "Clean" Paraffinic Processing Oils to Improve TPE Properties", Presented at TPEs 2000 Philadelphia, P A., Sep. 27-28, 19991.

TABLE 3

| | API Classification | | | | |
|---|---|---|---|---|---|
| | Group I | Group II | Group III | Group IV | Group V |
| % Saturates | <90 | ≥90 | ≥90 | Polyalpha-olefins (PAOs) | All others not belonging to Groups I-IV |
| % S | >0.03 | ≤0.03 | ≤0.03 | | |
| Viscosity Index (VI) | 80-120 | 80-120 | ≥120 | | |

Group III base stocks can also be produced from synthetic hydrocarbon liquids obtained from natural gas, coal or other fossil resources, Group IV base stocks are polyalphaolefins (PAOs), and are produced by oligomerization of α-olefins, such as 1-decene. Group V base stocks include all base stocks that do not belong to Groups I-IV, such as naphthenics, polyalkylene glycols (PAG), and esters.

These oligomers can be characterized by a Mn of from about 300 g/mol to about 9,000 g/mol (such as about 700 g/mol to about 1,300 g/mol). These oligomers may include isobutenyl mer units. Exemplary synthetic oils include, but are not limited to, polyisobutylene, poly(isobutylene-co-butene), and the like, and any combination thereof. For example, synthetic oils may include polylinear α-olefins, poly-branched α-olefins, hydrogenated polyalphaolefins, and the like, and any combination thereof.

The synthetic oils may include synthetic polymers or copolymers having a viscosity of about 20 cP or more (such as about 40 cP to about 4,000 cP, such as about 100 cP to about 1,000 cP, such as about 190 cP to about 500 cP), where the viscosity is measured by a Brookfield viscometer according to ASTM D4402-15 at 38° C.

Useful synthetic oils can be commercially obtained under the tradenames POLYBUTENE™ (Soltex; Houston, Tex.), and INDOPOL™ (Ineos). White synthetic oil is available under the tradename SPECTRASYN™ (ExxonMobil), formerly SHF Fluids (Mobil), ELEVAST™ (ExxonMobil), and white oil produced from gas to liquid technology such as RISELLA™ X 415/420/430 (Shell) or PRIMOL™ (ExxonMobil) series of white oils, e.g. PRIMOL™ 352, PRIMOL™ 382, PRIMOL™ 542, or MARCOL™ 82, MARCOL™ 52, DRAKEOL® (Pencero) series of white oils, e.g. DRAKEOL® 34, and the like, and any combination thereof. Oils described in U.S. Pat. No. 5,936,028 may also be employed.

Amounts

The thermoplastic vulcanizates of the present disclosure contain a sufficient amount of the ethylene-a-olefin-diene terpolymer rubbers to form rubbery compositions of matter. The skilled artisan will understand that rubbery compositions of matter include those that have ultimate elongations of about 100% or more, and that quickly retract to about 150% or less of their original length within about 10 minutes after being stretched to about 200% of their original length and held at about 200%/c of their original length for about 10 minutes.

The amount of rubber within the thermoplastic vulcanizates can be about 10 wt % to about 90 wt % ethylene-a-olefin-diene terpolymer rubbers (such as about 15 wt % to about 90 wt %, such as about 45 wt % to about 85 wt %, such as about 60 wt % to about 80 wt %) based on the total weight of the rubber and thermoplastic combined.

The amount of thermoplastic polymer within the thermoplastic vulcanizates can be about 10 wt % to about 85 wt % (such as about 10 wt % to about 40 wt %, such as about 12 wt % to about 30 wt %) based on the total weight of the rubber and thermoplastic combined.

With respect to the thermoplastic phase, the amount of propylene-based polymer present within the phase may vary in the presence of a complementary thermoplastic resin. For example, the thermoplastic phase may include about 75 wt % to about 100 wt % propylene-based polymer (such as about 85 wt % to about 99 wt %, or about 95 wt % to about 98 wt %) based on the total weight of the thermoplastic phase, with the balance of the thermoplastic phase including an ethylene based polymer. For example, the thermoplastic phase may include about 0 wt % to about 25 wt % an ethylene based polymer (such as about 1 wt % to about 15 wt %, or about 2 wt % to about 5 wt/6) based on the total weight of the thermoplastic phase.

With respect to the thermoplastic phase, the amount of butene-1-based polymer present within the phase may vary in the presence of a complementary thermoplastic resin. For example, the thermoplastic phase may include about 75 wt % to about 100 wt % butene-1-based polymer (such as about 85 wt % to about 99 wt %, such as about 95 wt % to about 98 wt %) based on the total weight of the thermoplastic phase, with balance of the thermoplastic phase including an ethylene based polymer. For example, the thermoplastic phase may include about 0 wt % to about 25 wt % an ethylene based polymer (such as about 1 wt % to about 15 wt %, such as about 2 wt % to about 5 wt %) based on the total weight of the thermoplastic phase.

Alternatively, where the thermoplastic phase may include a propylene-based polymer in addition to the butene-1-based polymer, the thermoplastic phase may include about 51 wt % to about 100 wt % of butene-1-based polymer (such as about 65 wt % to about 99.5 wt %, such as about 85 wt % to about 99 wt %, such as about 95 wt % to about 98 wt %) based upon the total weight of the thermoplastic phase, with the balance of the thermoplastic phase including an propylene-based polymer. For example, the thermoplastic phase may include about 0 wt % to about 49 wt % of propylene-based polymer (such as about 1 wt % to about 15 wt %, such as about 2 wt % to about 5 wt %) based on the total weight of the thermoplastic phase.

With respect to the oil, the thermoplastic vulcanizate may include about 50 parts by weight to about 200 parts by weight of extender oil per 100 parts rubber (such as about 50 parts by weight to about 150 parts by weight, such as about 75 parts by weight to about 120 parts by weight). The quantity of extender oil added can depend on the properties desired, with an upper limit that may depend on the compatibility of the particular oil and blend ingredients; this limit can be exceeded when excessive exuding of extender oil occurs. The amount of extender oil can depend, at least in part, upon the type of rubber. High viscosity rubbers are more highly oil extendable. Where ester plasticizers are employed, the ester plasticizers are generally used in amounts of about 250 parts or less, such as about 175 parts or less, per 100 parts rubber.

Fillers, such as carbon black, clay, talc, calcium carbonate, mica, wood flour, and the like, and any combination thereof may be added in amount about 1 parts by weight to about 250 parts by weight of filler per 100 parts by weight of rubber (such as about 10 parts by weight to about 250 parts by weight, such as about 10 parts by weight to about 150 parts by weight, such as about 25 parts by weight to about 50 parts by weight). The amount of filler (e.g., carbon black) that can be used may depend, at least in part, upon the type of carbon black and the amount of extender oil that is used.

In addition to the rubber, thermoplastic resins, and optional processing additives, the thermoplastic vulcanizates may optionally include reinforcing and non-reinforcing fillers, colorants, antioxidants, stabilizers, rubber processing oil, lubricants, antiblocking agents, anti-static agents, waxes, foaming agents, pigments, flame retardants, antistatic agents, slip masterbatches, ultraviolet inhibitors, antioxidants, and other processing aids known in the rubber and TPV compounding art. These additives can comprise up to about 50 weight percent of the total thermoplastic vulcanizate composition.

Preparation of Foamable Thermoplastic Vulcanizates

The ethylene-a-olefin-diene terpolymer rubbers of the TPV described herein is cured or crosslinked by dynamic vulcanization. The term "dynamic vulcanization" refers" to a vulcanization or curing process for a rubber contained in a blend with a thermoplastic resin, wherein the rubber is crosslinked or vulcanized under conditions of high shear at a temperature above the melting point of the thermoplastic. The ethylene-a-olefin-diene terpolymer rubbers can be cured by employing a variety of curatives. Exemplary curatives include phenolic resin cure systems, peroxide cure systems, and silicon-containing cure systems, such as hydrosilylation and silane grafting/moisture cure. Dynamic vulcanization can occur in the presence of the long-chain branched polyolefin, or the long-chain branched polyolefin can be added after dynamic vulcanization (i.e., post added), or both (i.e., some long-chain branched polyolefin can be added prior to dynamic vulcanization and some long-chain branched polyolefin can be added after dynamic vulcanization). The increase in crystallization temperature of the thermoplastic vulcanizate can be advantageously increased when dynamic vulcanization occurs in the presence of the high viscosity, long-chain branched polyolefin.

The ethylene-a-olefin-diene terpolymer rubbers can be simultaneously crosslinked and dispersed as fine particles within the thermoplastic matrix, although other morphologies may also exist. Dynamic vulcanization can be effected by mixing the thermoplastic elastomer components at elevated temperature in conventional mixing equipment such as roll mills, stabilizers, Banbury mixers. Brabender mixers, continuous mixers, mixing extruders and the like. Methods for preparing thermoplastic vulcanizates are described in U.S. Pat. Nos. 4,311,628, 4,594,390, 6,503,984, and 6,656,693, although methods employing low shear rates can also be used. Multiple-step processes can also be employed whereby ingredients, such as additional thermoplastic resin, can be added after dynamic vulcanization has been achieved as disclosed in International Application No. PCT/US04/30517.

The skilled artisan will be able to readily determine a sufficient or effective amount of vulcanizing agent to be employed without undue calculation or experimentation.

As noted above, the thermoplastic vulcanizates prepared according to the present disclosure are dynamically vulcanized by a variety of methods including employing a phenolic resin cure system, a peroxide cure system, a maleimide cure system, a silicon-based cure system (including hydrosilylation cure system, a silane-based system such as a silane grafting followed by moisture cure), sulfur cure system, or any combination thereof.

Useful phenolic cure systems are disclosed in U.S. Pat. Nos. 2,972,600, 3,287,440, 5,952,425 and 6,437,030.

The phenolic resin curatives may include resole resins, which can be made by the condensation of alkyl substituted phenols or unsubstituted phenols with aldehydes, such as formaldehydes, in an alkaline medium or by condensation of bi-functional phenoldialcohols. The alkyl substituents of the alkyl substituted phenols may contain about 1 to about 10 carbon atoms, such as dimethylolphenols or phenolic resins, substituted in para-positions with alkyl groups containing about 1 to about 10 carbon atoms. A blend of octylphenol-formaldehyde and nonylphenol-formaldehyde resins may be employed. The blend includes from about 25 wt % to about 40 wt % octylphenol-formaldehyde and from about 75 wt % to about 60 wt % nonylphenol-formaldehyde, such as from about 30 wt % to about 35 wt % octylphenol-formaldehyde and from about 70 wt % to about 65 wt % nonylphenol-formaldehyde. The blend may include about 33 wt % octylphenol-formaldehyde and about 67 wt % nonylphenol-formaldehyde resin, where each of the octylphenol-formaldehyde and nonylphenol-formaldehyde include methylol groups. This blend can be solubilized in paraffinic oil at about 30% solids without phase separation.

Useful phenolic resins may be obtained under the tradenames SP-1044, SP-1045 (Schenectady International; Schenectady, N.Y.), which may be referred to as alkylphenol-formaldehyde resins.

An example of a phenolic resin curative includes that defined according to the general formula

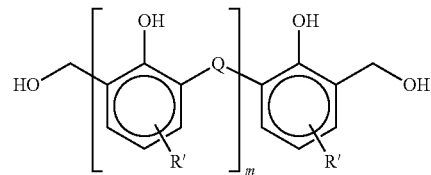

where Q is a divalent radical selected from the group consisting of —CH$_2$—, —CH$_2$—O—CH$_2$—; m is zero or a positive integer from 1 to 20 and R' is an organic group. Q is the divalent radical —CH$_2$—O—CH$_2$—, m is zero or a positive integer from 1 to 10, and R' is an organic group having less than 20 carbon atoms. Alternatively, m is zero or a positive integer from 1 to 10 and R' is an organic radical having between 4 and 12 carbon atoms.

The phenolic resin may be used in combination with a halogen source, such as stannous chloride, and metal oxide or reducing compound such as zinc oxide.

The phenolic resin may be employed in an amount from about 2 parts by weight to about 6 parts by weight, such as from about 3 parts by weight to about 5 parts by weight, such as from about 4 parts by weight to about 5 parts by weight per 100 parts by weight of ethylene-a-olefin-diene terpolymer rubbers. A complementary amount of stannous chloride may include from about 0.5 parts by weight to about 2.0 parts by weight, such as from about 1.0 parts by weight to about 1.5 parts by weight, such as from about 1.2 parts by weight to about 1.3 parts by weight per 100 parts by weight of rubber. In conjunction therewith, from about 0.1 parts by weight to about 6.0 parts by weight, such as from about 1.0 parts by weight to about 5.0 parts by weight, such as from about 2.0 parts by weight to about 4.0 parts by weight of zinc oxide may be employed. The olefinic rubber employed with the phenolic curatives may include diene units deriving from 5-ethylidene-2-norbornene.

Useful peroxide curatives include organic peroxides. Examples of organic peroxides include di-tert-butyl peroxide, dicumyl peroxide, t-butylcumyl peroxide, α,α-bis(tert-butylperoxy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, and the like, and any combination thereof. Also, diaryl peroxides, ketone peroxides, peroxydicarbonates, peroxyesters, dialkyl peroxides, hydroperoxides, peroxyketals, and the like, and any combination thereof may be used. Useful peroxides and their methods of use in dynamic vulcanization of thermoplastic vulcanizates are disclosed in U.S. Pat. No. 5,656,693, which is incorporated herein by reference for purpose of U.S. patent practice.

The peroxide curatives are employed in conjunction with a coagent. Examples of coagents include triallylcyanurate, triallyl isocyanurate, triallyl phosphate, sulfur, N-phenyl bis-maleamide, zinc diacrylate, zinc dimethacrylate, divinyl benzene. 1,2-polybutadiene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, and oximes such as quinone dioxime. In order to maximize the efficiency of peroxide/coagent crosslinking the mixing and dynamic vulcanization may be carried out in a nitrogen atmosphere.

The silicon-containing cure systems may include silicon hydride compounds having at least two Si—H groups. Silicon hydride compounds that are useful in practicing the present disclosure include methylhydrogenpolysiloxanes, methylhydrogendimethylsiloxane copolymers, alkylmethyl-co-methylhydrogenpolysiloxanes, bis(dimethylsilyl)alkanes, bis(dimethylsilyl)benzene, and the like, and any combination thereof.

Useful catalysts for hydrosilylation include transition metals of Group VIII. These metals include palladium, rhodium, and platinum, as well as complexes of these metals. Useful silicon-containing curatives and cure systems are disclosed in U.S. Pat. Nos. 5,936,028, 4,803,244, 5,672,660, and 7,951,871.

The silane-containing compounds may be employed in an amount from about 0.5 parts by weight to about 5.0 parts by weight per 100 parts by weight of rubber (such as from about 1.0 parts by weight to about 4.0 parts by weight, such as from about 2.0 parts by weight to about 3.0 parts by weight). A complementary amount of catalyst may include from about 0.5 parts of metal to about 20.0 parts of metal per million parts by weight of the rubber (such as from about 1.0 parts of metal to about 5.0 parts of metal, such as from about 1.0 parts of metal to about 2.0 parts of metal). The olefinic rubber employed with the hydrosilylation curatives includes diene units deriving from 5-vinyl-2-norbornene.

The skilled artisan will be able to readily determine a sufficient or effective amount of vulcanizing agent to be employed without undue calculation or experimentation.

For example, a phenolic resin can be employed in an amount of about 2 parts by weight to about 10 parts by weight per 100 parts by weight rubber (such as from about 3.5 parts by weight to about 7.5 parts by weight, such as from about 5 parts by weight to about 6 parts by weight). The phenolic resin can be employed in conjunction with stannous chloride and optionally zinc oxide. The stannous chloride can be employed in an amount from about 0.2 parts by weight to about 10 parts by weight per 100 parts by weight rubber (such as from about 0.3 parts by weight to about 5 parts by weight, such as from about 0.5 parts by weight to about 3 parts by weight). The zinc oxide can be employed in an amount from about 0.25 parts by weight to about 5 parts by weight per 100 parts by weight rubber (such as from about 0.5 parts by weight to about 3 parts by weight, such as from about 1 parts by weight to about 2 parts by weight).

Alternately, a peroxide can be employed in an amount from about $1 \times 10^{-5}$ moles to about $1 \times 10^{-1}$ moles, such as from about $1 \times 10^{-4}$ moles to about $9 \times 10^{-2}$ moles, such as from about $1 \times 10^{-2}$ moles to about $4 \times 10^{-2}$ moles per 100 parts by weight rubber. The amount may also be expressed as a weight per 100 parts by weight rubber. This amount, however, may vary depending on the curative employed. For example, where 4,4-bis(tert-butyl peroxy) diisopropyl benzene is employed, the amount employed may include from about 0.5 parts by weight to about 12 parts by weight, such as from about 1 parts by weight to about 6 parts by weight per 100 parts by weight rubber. The skilled artisan will be able to readily determine a sufficient or effective amount of coagent that can be used with the peroxide without undue calculation or experimentation. The amount of coagent employed is similar in terms of moles to the number of moles of curative employed. The amount of coagent may also be expressed as weight per 100 parts by weight rubber. For example, where the triallylcyanurate coagent is employed, the amount employed can include from about 0.25 phr to about 20 phr, such as from about 0.5 phr to about 10 phr, based on 100 parts by weight rubber.

Characteristics of the Foamable Thermoplastic Vulcanizate Compositions

The ethylene-a-olefin-diene terpolymer rubbers of the TPVs described herein may be highly cured. The ethylene-a-olefin-diene terpolymer rubber is advantageously partially or fully (completely) cured. The degree of cure can be measured by determining the amount of rubber that is extractable from the thermoplastic vulcanizate by using cyclohexane or boiling xylene as an extractant. This method is disclosed in U.S. Pat. No. 4,311,628, which is incorporated herein by reference for purpose of U.S. patent practice. The ethylene-a-olefin-diene terpolymer rubber may have a degree of cure where not more than about 5.9 wt/o, such as not more than about 5 wt %, such as not more than about 4 wt %, such as not more than about 3 wt % is extractable by cyclohexane at 23° C. as described in U.S. Pat. Nos. 5,100,947 and 5,157,081, which are incorporated herein by reference for purpose of U.S. patent practice. The rubber may also be cured to an extent where greater than about 94 wt %, such as greater than about 95 wt %, such as greater than about 96 wt %, such as greater than about 97 wt % by weight of the rubber is insoluble in cyclohexane at 23° C. Alternately, the rubber has a degree of cure such that the crosslink density is at least $4 \times 10^{-5}$ moles per milliliter of rubber, such as at least $7 \times 10^{-5}$ moles per milliliter of rubber, such as at least $10 \times 10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol. 68, pp. 573-584 (1995).

Despite the fact that the rubber may be partially or fully cured, the compositions of this disclosure can be processed and reprocessed by conventional plastic processing techniques such as extrusion, injection molding, blow molding, and compression molding. The rubber within these thermoplastic elastomers can be in the form of finely-divided and well-dispersed particles of vulcanized or cured rubber within a continuous thermoplastic phase or matrix. A co-continuous morphology or a phase inversion can be achieved. In those embodiments where the cured rubber is in the form of finely-divided and well-dispersed particles within the thermoplastic medium, the rubber particles can have an average diameter that is about 50 μm or less (such as about 30 μm or less, such as about 10 μm or less, such as about 5 μm or less, such as about 1 μm or less). Preferably, at least about 50%, such as about 60%, such as about 75% of the particles have an average diameter of about 5 μm or less, such as about 2 μm or less, such as about 1 μm or less.

The thermoplastic vulcanizates have one or more of the following characteristics:

1) An amount of an ethylene-a-olefin-diene terpolymer rubber that is between about 10 wt % to about 90 wt % (such as between about 20 wt % and about 80 wt %) based on the total weight of the thermoplastic vulcanizate. The ethylene-a-olefin-diene terpolymer may preferably be any EPDM described herein.

2) Includes a polyolefin, such as a polypropylene. The polypropylene can be any polypropylene described herein. For example, a polypropylene that has an MFR between about 0.1 g/10 min and about 50 g/10 min (such as between about 0.5 g/10 min and 10 g/10 min, such as between about 0.5 g/10 min and about 3 g/10 min), and a weight average molecular weight (Mw) between about 100,000 g/mol and about 1,000,000 g/mol (such as between about 100,000 g/mol and about 600,000 g/mol or between about 400,000 g/mol and about 800,000 g/mol), where the polypropylene includes a homopolymer, random copolymer, or impact copolymer polypropylene, or any combination thereof. The polypropylene is a high melt strength (HMS) long chain branched (LCB) homopolymer polypropylene.

3) A hardness that is between about 20 Shore A to about 60 Shore D, such as between about 40 Shore A and about 80 Shore A, such as between about 50 Shore A and about 70 Shore A.

4) A stress relaxation slope that is between about −1 and about −5 (1/min) (Elastocon), such as between about −2 and about −4.5 (1/min) (Elastocon).

5) A G' value (d 90° C., 0.6 rad/s, and 1% strain) that is between about 600 kPa and about 2000 kPa, such as between about 700 kPa and about 1400 kPa.

6) A tan δ (@ 90° C., 5 rad/s, and 1% strain) that is between about 0.3 and about 1, such as between about 0.5 and about 0.9.

7) A tan δ value (@ 215° C., 5.0 rad/s, and 100% strain) of from about 0.25 to about 1.0, such as between about 0.35 and about 0.9, such as between about 0.4 and about 0.8, such as between about 0.5 and about 0.7.

8) A surface roughness that is between about 30 μm and about 150 μm, such as between about 50 μm and about 100 μm.

9) A die pressure (psi) that is between about 50 psi and about 300 psi, such as between about 70 psi and about 280 psi, such as between about 90 psi and about 230 psi based on runs on a 1.5" (screw diameter) Davis-Standard single screw extruder.

10) An output that is between about 4 kg/h and about 14 kg/h, such as between about 6 kg/h and about 12 kg/h, such as between about 7 kg/h and about 8 kg/h based on based on runs on a 1.5" (screw diameter) Davis-Standard single screw extruder.

11) An amount of amps that is between about 2 amps and about 10 amps, such as between about 3 amps and about 7 amps, such as between about 4 amps and about 6 amps based on runs on a 1.5" (screw diameter) Davis-Standard single screw extruder.

12) An amount of total surface spots that is between about 0 spots and about 50 spots, such as between about 0 spots and about 20 spots, such as between about 1 spot and about 9 spots.

13) A tension set that is between about 8% and about 19%, such as between about 10% and about 17%, such as between about 12% and about 15%, where tension set is measured as described below.

14) A compression set that is between about 30% and about 90%, such as between about 50% and about 80%, such as between about 50% and about 70%, where compression is measured as described below.

15) An elongation to break (%) that is between about 150% and about 600%, such as between about 150% and about 400%, such as between about 200% and about 350%.

16) A tensile strength that is between about 2 MPa and about 9 MPa, such as between about 2 MPa and about 8 MPa, such as between about 3 MPa and about 8 MPa.

17) A weight gain percent that is between about 30% to about 100%, such as between about 40% to about 80%, such as between about 50% to about 80%.

An extruded tape comprising the thermoplastic vulcanizate composition is provided. The thermoplastic vulcanizate composition can be any thermoplastic vulcanizate composition described herein. The thermoplastic vulcanizate composition of the extruded tape has a surface roughness of from about 30 μm to about 150 μm, such as from about 50 μm to about 100 μm.

Preparation of Foamed Thermoplastic Vulcanizates

Any process for fabricating TPVs may be employed for forming the foam compositions of the present disclosure and as described herein. Generally, the rubber of the TPV has already been at least partially vulcanized. For example, the individual materials and components, such as the one or more rubber component, thermoplastic component, and any additional additives, can be mixed at a temperature above the melting temperature of the thermoplastic component to form a melt. Illustrative mixing equipment may include, but is not limited to, extruders with kneaders or mixing elements with one or more mixing tips or flights, extruders with one or more screws, and extruders of co- or counter-rotating type. Suitable mixing equipment may include, for example, BRABENDER™ mixers, BANBURY™ mixers, BUSS™ mixers and kneaders, and FARREL™ continuous mixers. One or more of those mixing equipment, including extruders, can be used in series, without departing from the scope of the present disclosure. Additional details for making a TPV is described in U.S. Pat. No. 4,594,390, which is hereby incorporated by reference in its entirety. Preferably, the TPV foam compositions described herein are processed by extrusion.

Foaming can be by any suitable method including, but not limited to, the MUCELL™ process (commercial foaming process available from Trexel of Woburn, MA using supercritical gas), the inclusion of thermo-expandable microspheres, chemical foaming processes (provided the closed cell structure and water uptake requirements are met), and the like.

In the MUCELL™ process, as best understood, a gas (such as nitrogen or argon) is pumped into an injection mold while an assembly component or cap assembly is being molded, resulting in a multi-void "aerated" molded structure that is lightweight because of the multiple-voids introduced during the molding step.

As used herein, the terms "thermo-expandable microsphere" and "thermo-expandable microsphere foaming agent," and grammatical variants thereof, refer to a TPV foaming agent having a polymer shell (e.g., a thermoplastic shell) encapsulating a propellant. When heated, the thermo-expandable microspheres expand, such as up to about 80 times their original volume. Descriptions of suitable thermo-expandable microspheres are included in U.S. Pat. Nos. 6,582,633 and 3,615,972, WO/1999/046320, and WO/1999/043758, which are hereby incorporated by reference in their entirety. Examples of commercially available thermo-expandable microspheres include, for example, EXPANCEL™ products, available from Akzo Nobel N.V, Amsterdam. Netherlands.

A thermo-expandable microsphere (also referred to herein simply as "microsphere") in the foam composition according to the present disclosure acts as a foaming agent, comprising a polymer shell encapsulating a propellant. In the microsphere, the polymer shell is generally a thermoplastic and may be made of a homo- or co-polymer of ethylenically unsaturated monomers, such as nitrile-containing monomer; the propellant is generally a liquid (e.g., a hydrocarbon) having a boiling temperature not higher than the softening temperature of the polymer shell. The expansion of the thermoplastic microspheres is governed entirely by physics. As the propellant is heated, the propellant evaporates and increases the intrinsic pressure, and at the same time, the shell softens due to exposure to the heat, thus causing the microsphere to expand. Generally, the microspheres may expand from about 2 to about 8 times their initial (non-heated) diameter or about 30 to about 80 times volume, and the thickness of polymer shell decreases to about 0.1 μm or less, encompassing any value and subset therebetween. The factors determining the expandability of the microspheres include the volatility of the encapsulated propellant, the gas permeability of the heated propellant, and the viscoelasticity of the polymer shell.

Various monomers are suitable for preparation of the polymer shell and may include, but are not limited to, acrylonitrile, methacrylonitrile, α-haloacrylonitrile, α-ethoxyacrylonitrile, fumarc nitrile, an acrylic ester, and any combination thereof. Preferably, the polymer shell comprises polyacrylonitrile. The polymer shell generally has an expansion temperature (i.e., the glass transition temperature ($T_g$)) of from about 80° C. to about 200° C. depending on the composition of the polymer shell, encompassing any value and subset therebetween.

The liquids suitable for preparation of the propellant of the thermo-expandable microsphere usually have a boiling point lower than the softening temperature of the polymer shell at atmosphere pressure. Suitable liquids may include, but are not limited to, isobutene; 2,3-dimethylbutane; 2-methylpentane; 3-methylpentane; n-hexane, cyclohexane, heptane, isooctane, and any combination thereof.

When a thermo-expandable microsphere of the present disclosure is heated, it begins to expand at a certain temperature. The temperature at which the expansion starts is called the "minimum expansion temperature" or "$T_{start}$," while the temperature at which expansion is complete (i.e., the maximum expansion) is called the "maximum expansion temperature" or "$T_{max}$." The $T_{start}$ and $T_{max}$ can be measured by thermomechanical analysis (TMA) of the thermal expansion quality of the microsphere. The thermo-expandable microsphere suitable for forming the foam composition of the present disclosure may have a $T_{start}$ of greater than about 100° C., preferably greater than about 110° C., or about 120° C., or about 130° C., or about 140° C., of about 160° C. encompassing any value and subset therebetween. The thermo-expandable microsphere suitable for forming the foam composition of the present disclosure may have a $T_{max}$ of less than about 300° C., more preferably less than about 260° C., or about 240° C., or about 220° C., or about 210° C., encompassing any value and subset therebetween. That is, the range of $T_{start}$ to $T_{max}$ may be about 100° C. to about 300° C., encompassing any value and subset therebetween. Preferably, the $T_{max}$ temperature is in the range of about 160° C. to about 240° C., or about 170° C. to about 200° C., encompassing any value and subset therebetween.

The thermoplastic vulcanizates and the microspheres are selected for inclusion in forming the foam composition of the present disclosure such that the melt temperature of the TPV and the $T_{max}$ of the microspheres are similar. In so doing, the expansion of the microspheres can be reliably (including completely) achieved without breaking the outer polymer shell, thereby ensuring desired closed cell structure and low water absorption of the resulting foam composition. This similarity in melt temperature and $T_{max}$ is an advantage recognized by the present disclosure. The melt temperature and $T_{max}$ are within about ±40° C. of one another, encompassing any value and subset therebetween. Alternatively, the melt temperature and $T_{max}$ are within ±30° C., or preferably +20° C., +10° C., +5° C. or have identical melt and $T_{max}$ temperatures, encompassing any value and subset therebetween. The temperature similarity of the selected material may further depend on the particular processing method and equipment used. For example, depending on equipment and shear heating behavior, selection of the particular temperature similarity may be more or less important to achieve the desired closed cell structure and low water absorption.

The thermo-expandable microspheres suitable for forming the foam composition of the present disclosure before expansion may have various average particle sizes. The particle size of the microspheres before expansion may range from about 1 micrometer (μm) to about 500 μm, preferably from about 2 μm to about 300 μm, more preferably from about 4 μm to about 100 μm, and most preferably from about 5 μm to about 50 μm, encompassing any value and subset therebetween. The average particle size of the microspheres after expansion is generally about 2 to about 8 times their initial (non-heated) size, such as in the range of from about 2 µm to about 4000 µm, encompassing any value and subset therebetween. The average particle size of the microspheres after expansion is preferably not less than about 50 µm or not less than about 80 µm, or more preferably not less than about 100 µm or not less than about 120 µm. Selection of a particular sized microsphere may be based on a number of factors, such as cost, surface appearance, and the final properties of the foam (e.g., foam quality). For example, if the microspheres are too small, a greater microsphere amount may be required to achieve the desired properties, which may increase costs. Alternatively, selection of too large microspheres may alter surface appearance compared to the same density of microspheres having relatively smaller sizes. The microspheres after expansion are preferably in the range of about 20 µm to about 140 µm, or about 40 µm to about 120 µm, or about 60 µm to about 100 µm, or about 80 µm.

The production of thermo-expandable microspheres can be achieved by any method known to one of skill in the art, such as a method comprising a step of polymerizing the monomers in an aqueous suspension in the presence of a propellant. Examples of such methods are described in U.S. Pat. No. 3,615,972, WO/1999/046320, and WO/1999/043758, each of which is hereby incorporated by reference in their entirety.

The amount of the thermo-expandable microsphere in the composition according to the present disclosure ranges from 0.5 wt % to about 5 wt/u by the total weight of the foam composition, encompassing any value and subset therebetween. This amount of microsphere in the foam composition allows the foam to achieve the desired foam quality, described hereinbelow, and the desired mechanical properties. The thermo-expandable microsphere is preferably present in the foam compositions described herein in the range of from about 0.5 wt. % to about 2.5 wt. %, or about 1.5 wt. % to about 2.5 wt. %, encompassing any value and subset therebetween.

The physical expansion of a thermo-expandable microsphere results in a foam having a closed, and homogenous, cell structure, which provides low water absorption of the foamed composition according to the present disclosure.

A foam composition comprising a thermoplastic vulcanizate including an at least partially vulcanized rubber component and a thermoplastic component is provided, the composition of which may be foamed using the thermo-expandable microsphere described above. The present disclosure also provides a method of preparing the foam composition including the steps of (i) blending the thermoplastic vulcanizate with the thermo-expandable microsphere foaming agent and (ii) extruding the blend at an extrusion temperature to form the foam.

The foam of present disclosure may be preferably prepared by extrusion molding. As used herein, the term "extrusion molding," and grammatical variants thereof (e.g., "extrusion molding"), refers to any process performed by a component of an extruder, including blending (e.g., when no pre-blending is used), screw mixing, feeding through a die, and the like. The term "blending" encompasses any type of blending including, but not limited to, dry blending, melt blending, and hopper blending.

In an extrusion process, all ingredients can be pre-blended and fed into a hopper of an extruder. Alternatively, the ingredients may be blended using the extruder itself, such that each component is separately fed into the hopper. The shearing developed by the screw of the extruder will plasticize and mix the ingredients together. Accordingly, in any embodiments of the present disclosure, the ingredients may be blended by any method known to one of skill in the art, including dry blending, melt blending, hopper blending, or mixing by extruder. Pressure is built up against a die, and the blended ingredients are pushed out in a given shape. Within the hopper and/or outside of the die, the thermo-expandable microsphere may expand and create the foam structure when at a temperature between the $T_{start}$ and $T_{max}$ values. The expansion process stops when the gas pressure inside the polymer shell becomes lower than the modulus of the polymer.

An extruder for use in preparing the foam compositions of the present disclosure may be any suitable instrument known in the art for monocomponent or multicomponent extrusion, such as for combining at least two up to five materials. The extruder is a smooth barrel extruder or a grooved barrel extruder.

Generally, it is preferred that high shearing action is produced in the selected extruder for forming the foam composition of the present disclosure. The screw may be any suitable instrument known in the art, provided that it can produce appropriate shearing including, for example, a pin screw, a Maddock-type screw, or a barrier screw. Preferably, the screw is a barrier screw or a Maddock-type screw. The extruder may have a ratio of length to diameter of more than about 20.

The preparation of the foam according to the present disclosure is independent from screw speed (revolutions per minute (RPM)) because the foaming of thermo-expandable microsphere is only a temperature dependent process, as described herein. The screw speed during the extrusion process may accordingly be either slow or fast, without affecting the foaming quality, such as in the range of about 5 RPM to about 100 RPM, encompassing any value and subset therebetween, provided that the selected speed does not compromise the integrity of the polymer shell of the thermo-expandable microsphere.

The blending and/or extrusion of the ingredients of the foam of the present disclosure in the extruder is generally performed at an extrusion temperature not exceeding about 400° C., preferably not exceeding about 300° C. and more particularly not exceeding about 250° C. The minimum extrusion temperature is generally higher than or equal to about 130° C., preferably higher than or equal to about 150° C. and more particularly higher than about 160° C.

The extrusion temperature is selected such that it is within about ±40° C. of both the melt temperature of the TPV and the $T_{max}$ of the thermo-expandable microsphere in the foam composition, encompassing any value and subset therebetween. For example, the extrusion temperature may be within ±30° C., or preferably ±20° C., ±10° C., ±5° C. or be identical to the melt and $T_{max}$ temperatures, encompassing any value and subset therebetween. The extrusion temperature is in the range of about 160° C. to about 240° C. or about 170° C. to about 200° C., encompassing any value and subset therebetween.

The foam compositions can be extruded by using a robotic extrusion process. Robotic extrusion facilitates the extrusion of a calibrated profile of a thermoplastic polymer onto articles wherein the articles are positioned in the processing region of an automatic handling unit (robot). The polymer melted in an extruder is fed, via a heated pressure hose, to a heated extruder head which is guided by the automatic handling unit and provided with an extrusion die. The polymer is extruded and deposited on the articles. The connection between the cylinder of the extruder and the extrusion nozzle/die is provided by an electrically heated high pressure hose. The high pressure hose must withstand pressures of at least about 250 bar at operating temperature. The hose comprises an electrical heating coil which provides for a regulated heating of the hose to a temperature of about 200° C. On the other hand, the high pressure hose must be sufficiently flexible for it to be able to follow the movements of the extrusion die without restriction, and for it to not interfere with the movements of the robot. The high pressure hose does inevitably have a certain torsional stiffness by which, in certain circumstances, it can interfere with the extrusion operation.

For example, during a circuit of the manipulation head around a glass pane, the extrusion die is rotated through 360°, and this torsional movement is transmitted to the hose. By this continual torsional loading, the hose is harmed, which results in accelerated wear of the hose and its fixations. Also, the corresponding reaction forces are transmitted by these torsional forces into the manipulating head. This can lead to inaccuracy in the extrusion operation.

Robotic Extrusion

The foamable TPV composition according to the present disclosure may be supplied via an extruder and a heated pressure hose to a heated extrusion die. The die is guided by a robot, and the elastomer may be extruded and laid by means of the extrusion die onto the surface. Thus, a presently disclosed method comprises supplying the thermoplastic elastomer to the surface of the article where it is to be applied, optionally after an appropriate pretreatment of the surfaces. The die is guided by an automatic handling device and the elastomer is extruded and applied by means of the extrusion die on the surface of the article.

For the method according to this invention, usual screw extruders may be used, which heat the foamable TPV of this invention to the necessary processing temperature by external cylinder heaters. The melted elastomer is supplied to the extrusion die via a flexible hose, also provided with a suitable heater, which hose must be capable of resisting the high pressures corresponding to the viscosity of the thermoplastic elastomer. The extrusion die is also heated by means of a suitable heater to the necessary processing temperature of the elastomer, and is guided by means of a robot, for instance, along the edge of the article. For further particulars about robotic extrusion, reference is made to U.S. Pat. No. 5,336,349 and WO/2003/095538A1, the disclosures of which are incorporated herein by reference in their entirety.

For further particulars about the extrusion of foamable elastomers, reference is made to WO/1999/058314 and U.S. Pat. No. 6,329,439, the disclosures of which are incorporated herein by reference. By means of a method of the present invention, a foamed article with superior properties may be applied directly to the surface of a work-piece, for instance a glass pane. In some instances, pretreatment of the surface with a suitable adhesion promoter may be necessary.

The foam compositions prepared according to the present disclosure exhibits superior, low water absorption values, reduced density and hardness, and suitable physical properties suitable for soft touch applications, and more particularly for use in forming sealing products.

The foamed extrudate according to the invention has foam-rubber like properties. The foam has a specific gravity of less than about 0.9, preferably of less than about 0.8, most preferably of less than about 0.7. The lowest specific gravity achievable is at least 0.2.

The foam compositions of the present disclosure having a TPV and thermo-expandable microsphere blend may have one or more of the following characteristics (1)-(9).

(1) The foam compositions of the present disclosure may exhibit a specific gravity of 0.2 to 0.9 (such as 0.4 to 0.75, such as 0.5 to 0.7), as determined by ASTM D792-13.

(2) The foam compositions of the present disclosure may exhibit a water absorption of less than about 20% (including 0%) (such as about 0.01% to about 20%, such as less than about 0.01% to about 10%, or about 0.01% to about 5%) at a pressure of 172 millibar (mbar) below atmosphere, as determined by ASTM D1056-14. Three parts of 5 cm each are cut from foamed strios. This low water absorption is observed as a result of inclusion of the microspheres, and indicates that the foam composition is closed cell in nature, thereby able to be used in forming various physical commercial products such as automotive weather seals described herein.

(3) The foam compositions of the present disclosure may exhibit an elongation at break as determined by ISO37 of greater than about 150% (such as about 150% to about 400%, such as about 180% to about 300%, such as about 200% to about 300%).

(4) The foam compositions of the present disclosure may exhibit a tensile strength at break as determined by ISO37 of about 1 MPa to about 4 MPa (such as about 1.2 MPa to about 3 MPa, such as about 1.4 MPa to about 4 MPa).

(5) The foam compositions of the present disclosure may exhibit a hardness range of 20 Shore A to 90 Shore A (such as preferably 30-80 Shore A, such as 30-70 Shore A).

(6) The foam compositions of the present disclosure may exhibit a tension set (50% elongation, 70° C., 22 hrs, take out from oven under stress for 2 hours then release for 30 min, and measure) of about 20% or less (such as about 18% or less, such as about 15% or less, or such as about 5% or less).

(7) The foam compositions of the present disclosure may exhibit a tension set (25% elongation, 70° C., 22 hrs, take out from oven under stress for 2 hours then release for 30 min, and measure) of about 12% or less (such as about 5% to about 12%, such as about 7% to about 10% or less).

(8) The foam compositions of the present disclosure may exhibit a tensile stress at 100% strain (M100) of about 0.8 MPa or greater (such as about 0.8 MPa to about 3 MPa, such as about 1 MPa to about 3 MPa, such as about 1.5 MPa to about 3 MPa).

(9) The foam compositions of the present disclosure may have 50% or greater (such as 70% or greater, such as 90% or greater) of the cells in the foam being closed cell structures.

As described above, the foam according to the present disclosure is suitable to preparation of a commercial product or article such as a weather seal (e.g., a door or window seal of a building; a door, window, or trunk seal of an automobile, and the like), and the like, and any combination thereof. Accordingly, the instant disclosure provides a weather seal product or article formed from the foam compositions described herein.

The sealing product or article may be solely made from the foam composition described herein. Alternatively, the foam according to the present disclosure may have a surface treatment (or skin layer) applied thereto. The surface treatment may be used to enhance one or more qualities of the seal including, but not limited to, friction reduction, abrasion and wear protection, external environment exposure protection, and, while not needed, additional water absorption reduction. The surface treatment may be composed of a thermoplastic elastomer, such as a thermoplastic vulcanizate described herein. This layered structure forming a sealing product or article may offer improved functionality to the product or article, without compromising the beneficial properties of the foam composition itself. An example of a suitable material for use as a surface treatment applied to the foam compositions described herein includes SANTO-PRENE™ 123-52W242 thermoplastic vulcanizate, available from ExxonMobil Chemicals, Houston, Texas An alternative example of a surface treatment includes co-extrusion of the foam composition with any other material or material profile, such as a dense material (e.g., dense foam), sponge material, and/or a rigid carrier. The dense or sponge material may provide protection and/or additional sealing capability to a sealing product and the rigid carrier (e.g., a rigid plastic or metal carrier) may be provided to add structure to a sealing product for use in specific commercial applications.

When included, the surface treatment may be applied to the foam compositions of the present disclosure as part of or after the extrusion process, without departing from the scope of the present disclosure. For example, the surface treatment may be sandwich molded or co-extruded with the foam composition during the extrusion process, or may be applied after the foam is fed through the die of an extruder, such as by painting, spraying, sputtering, or other coating or encapsulation method.

The present invention further relates to an automotive screen having a sealing profile along or to the edge of the glass module manufactured by robotic extrusion. When the glass pane is placed in the window frame of an automobile body, the elastic bends about the peripheral surface of the glass pane, thus ensuring an automatic centering of the glass pane in the window opening. Furthermore, the lip fills the gap between the peripheral face of the glass pane and the flange of the window frame, opposite the peripheral face. Instead of this lip, a hose-like hollow profile may be provided, which fulfills the same purpose.

The foamed TPV of the present invention can be applied to a plurality of combined sealing members in the form of various weatherstrip seals that can be used in a vehicle. The foamed TPV can be used in combined sealing members configured as various weatherstrip seals, including those coupled to the perimeter of the door, such as a secondary door seal and a primary door seal. The foamed TPV composition of this invention can also be a dynamic sealing member in the form of a rocker seal used to seal an underbody with a foot well of a motor vehicle. Further, the foamed TPV of this invention can be applied as a liftgate seal configured to provide a functional seal used to couple a back hatch with a flip glass seal positioned against a liftable rear glass window. Similarly, a pillar margin seal may be configured to seal another pillar of the vehicle. A variety of schematics of the combined sealing members for which the inventive foamed TPV composition can be employed such as the secondary door seal, the primary door seal, the rocker seal, the liftgate seal, the flip glass seal and the pillar margin seal are described in U.S. Pat. App. No. 2018/0163032 A1.

As also outlined below, the pore size of the microdense portion can be adjusted or varied by the choice of foaming agent and/or processing conditions.

End Uses

The thermoplastic vulcanizates of this disclosure are useful for making a variety of molded and extruded articles such as sealing profiles (e.g., weather seals such as a glass run channel weather seal), door panels, hoses, belts, gaskets, moldings, boots, pipe seal, and like articles. They are particularly useful for making articles by blow molding, extrusion, injection molding, thermo-forming, elasto-welding and compression molding techniques. More specifically, they are useful for making vehicle parts such as weather seals, brake parts such as cups, coupling disks, and diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

Generally, seals for motor vehicle door openings (also referred to as profiled seals in the art) comprise a retaining zone such as a U-shaped grip, on a rebate receiving a frame, with additionally in some cases a flexible and deformable adjacent part making it possible to ensure the seal at all points between the opening and the door frame of the bodywork, for example. Said seals essentially have to meet the following requirements: retention by clamping onto the rebate and resistance to stresses capable of causing tearing or "unhooking" relative to said rebate; flexibility to follow the often complex shape of the mounting perimeter, with more or less small radii of curvature and to facilitate the packaging thereof; stability of the grip on the rebate to prevent the tilting thereof (and potentially the loss of sealed contact) or excessive deformation of the sealed zone which depends, in particular, on the positioning of the neutral axis of the profiled element (i.e., of its imaginary longitudinal line or plane not having any deformation of the compression type or any extension when said profiled element follows a radius); facility for mounting or "hooking" onto the rebate; low weight to assist with reducing the weight of the vehicle; low manufacturing cost: and, preferably, recyclability.

A detailed description of different seal profiles/articles/module embodiments, where the inventive foamed TPV composition is particularly useful can be found in U.S. Pat. App. Pub. Nos. 2018/0163031, 2018/0141421, 2013/0180179, 2013/0055644, each of which is incorporated herein by reference.

A method of forming an article may include extruding, injection molding, blow molding, compression molding, or thermoforming any thermoplastic vulcanizate composition described herein; and forming the article. Articles include those articles provided herein.

A method of making any thermoplastic vulcanizate composition provided herein includes: introducing a ethylene-a-olefin-diene terpolymer to an extrusion reactor; introducing a thermoplastic resin to the extrusion reactor; introducing a filler, an additive, or a combination of filler and additive to the extrusion reactor; introducing a first amount of process oil to the extrusion reactor at a first oil injection location; introducing a curative to the extrusion reactor at a location that is downstream of the first or second oil injection location (if second amount of oil injection is applicable); introducing a second amount of process oil to the extrusion reactor at a second oil injection location, where the second oil injection location is downstream of the location where the curative is introduced to the extrusion reactor; and dynamically vulcanizing the rubber with the curative in the presence of the thermoplastic resin to form the thermoplastic vulcanizate, wherein the thermoplastic vulcanizate comprises a rubber phase that is dispersed and at least partially cross linked within a continuous thermoplastic matrix.

The extrusion reactor is a twin screw reactor. An extruder throughput rate is 60 kg/hr or more, such as 70 kg/hr or more, such as 90 kg/hr or more.

EXAMPLE EMBODIMENTS

An example embodiment is a sealing profile or article comprising: a foamed thermoplastic vulcanizate composition comprising: a thermoplastic polyolefin; and an ethylene-a-olefin-diene terpolymer elastomer having: a weight-average molecular weight Mw of from 200,000 g/mol to 3,000,000 g/mol, a Mw/Mn of 4.0 or lower, and a $g'_{vis}$ of 0.90 or greater, wherein the foamed thermoplastic vulcanizate composition has a specific gravity of 0.2 to 0.9.

The example embodiment can include one or more of the following: Element 1: wherein the ethylene-a-olefin-diene terpolymer elastomer has a $\Delta\delta$ of from 30 to 80° from small amplitude oscillatory shear (SAOS), where $\Delta\delta=\delta$ (0.1 rad/s)–$\delta$ (128 rad/s), or a large amplitude oscillatory shear (LAOS) branching index of less than 3.0; Element 2: wherein the thermoplastic olefin comprises a polypropylene; Element 3: wherein the elastomer comprises ethylene-propylene-diene terpolymer, an ethylene-butene-diene terpolymer, an ethylene-octene-diene terpolymer, or combinations thereof; Element 4: wherein the ethylene-a-olefin-diene terpolymer elastomer is produced by a slurry polymerization process using a Zeigler-Natta catalyst or a metallocene catalyst: Element 5: wherein the ethylene-a-olefin-diene terpolymer elastomer is produced by a solution or gas phase polymerization process using a Zeigler-Natta catalyst or a metallocene catalyst; Element 6: a sealing profile or article further comprising one or more of an oil and plasticizer: Element 7: wherein the one or more of the oil and plasticizer comprises a mineral oil, a synthetic oil, an organic ester or any combination thereof; Element 8: wherein the mineral oil comprise an aromatic oil, a naphthenic oil, a paraffinic oil, an isoparaffinic oil, a synthetic oil, or any combination thereof: Element 9: a sealing profile or article further comprising a compatibilizer, a filler, or a nucleating agent; Element 10: a sealing profile or article further comprising calcium carbonate, clay, silica, talc, titanium dioxide, carbon black, mica, wood flour, a nucleating agent, or any combination thereof; Element 11: a curative system, wherein the curative system comprises a curative; Element 12: wherein the curative comprises a phenolic resin, a peroxide, a maleimide, a silicon-based curative, a silane-based curative system, sulfur-based cure system, or any combination thereof; Element 13: wherein the curative is a hydrosilylation curative; Element 14: wherein the curative is a phenolic resin; Element 15: wherein the ethylene-a-olefin-diene terpolymer elastomer has a Mw of from 400,000 g/mol to 1,000,000 g/mol; Element 16: wherein the ethylene-a-olefin-diene terpolymer elastomer has a Mw/Mn of 3.0 or lower: Element 17: wherein the ethylene-a-olefin-diene terpolymer elastomer has a Mw/Mn of 2.5 or lower; Element 18: wherein the ethylene-a-olefin-diene terpolymer elastomer has a $g'_{vis}$ of 0.95 or greater; Element 19: wherein the ethylene-a-olefin-diene terpolymer elastomer comprises an ethylene content of 50 wt % to 70 wt % and a diene content of 4 wt % to 12 wt %, each based on a total weight of the ethylene-a-olefin-diene terpolymer elastomer: Element 20: wherein the ethylene-a-olefin-diene terpolymer elastomer comprises an ethylene content of 55 wt % to 65 wt % and a diene content of 4 wt % to 9 wt %, each based on a total weight of the ethylene-a-olefin-diene terpolymer elastomer; Element 21: wherein the diene of the ethylene-a-olefin-diene terpolymer elastomer comprises 5-ethylidene-2-norbornene (ENB), 5-vinyl-2-norbornene (VNB), or any combination thereof: Element 22: wherein the diene of the ethylene-a-olefin-diene terpolymer elastomer is ENB; Element 23: the ethylene-a-olefin-diene terpolymer elastomer has a dry Mooney Viscosity (ML1+4 @ 125° C.) of 200 MU or greater; Element 24: wherein the ethylene-a-olefin-diene terpolymer elastomer has a dry Mooney Viscosity (ML1+4 @ 125° C.) of 300 MU or greater; Element 25: wherein the ethylene-a-olefin-diene terpolymer elastomer has a LAOS long chain branching index of 2.5 or lower; Element 26: wherein the ethylene-a-olefin-diene terpolymer elastomer has a LAOS long chain branching index of 2.0 or lower: Element 27: wherein the ethylene-a-olefin-diene terpolymer elastomer has a $\Delta\delta$ of 320 or greater, where $\Delta\delta=\delta$ (0.1 rad/s)–$\delta$ (128 rad/s); Element 28: wherein the ethylene-a-olefin-diene terpolymer elastomer has a $\Delta\delta$ of 35° or greater, where $\Delta\delta=\delta$ (0.1 rad/s)–$\delta$ (128 rad/s); Element 29: wherein the ethylene-a-olefin-diene terpolymer elastomer is oil extended with an oil having 50 phr to 200 phr based on 100 phr of the ethylene-a-olefin-diene terpolymer elastomer; Element 30: wherein the ethylene-a-olefin-diene terpolymer elastomer is oil extended with an oil having 75 phr to 120 phr based on 100 phr of the ethylene-a-olefin-diene terpolymer elastomer; Element 31: wherein the ethylene-a-olefin-diene terpolymer elastomer content is from 10 wt % to 90 wt % based on a total weight of the thermoplastic polyolefin and the ethylene-a-olefin-diene terpolymer elastomer; Element 32: wherein the thermoplastic olefin is one or more of a homopolymer, random or impact copolymer polypropylene having a melt mass flow rate (ASTM D1238-13; 230° C.: 2.16 kg) of from 0.1 g/10 min to 50 g/10 min, and a Mw of from 100,000 g/mol to 1,000,000 g/mol; Element 33: wherein the thermoplastic olefin is one or more of a homopolymer, random or impact copolymer polypropylene having a melt mass flow rate (ASTM D1238-13; 230° C.; 2.16 kg) of from 0.5 g/10 min to 5 g/10 min, a Mw of from 400,000 g/mol to 800,000 g/mol, and a $g'_{vis}$ of 0.90 or less; Element 34: wherein the thermoplastic vulcanizate is foamed with a thermo-expandable microsphere foaming agent; Element 35: wherein the thermoplastic vulcanizate is foamed via chemical foaming agent or a foaming process involving supercritical gas; Element 36: wherein the thermo-expandable microsphere foaming agent is present in an amount of about 0.5% to about 5% by weight of the foam; Element 37: wherein the thermo-expandable microsphere foaming agent has a maximum expansion temperature and the thermoplastic vulcanizate has a melt temperature, both within a temperature range of ±40° C. of each other; Element 38: wherein the temperature range is ±5° C.; Element 39: wherein the maximum expansion temperature and the melt temperature are about 160° C. to about 240° C.; Element 40: wherein the maximum expansion temperature and the melt temperature are about 170° C. to about 200° C.: Element 41: wherein the foamed thermoplastic vulcanizate composition has a water absorption of less than about 20% at a pressure of 172 millibar (mbar) below atmosphere; Element 42: wherein the foamed thermoplastic vulcanizate composition has a water absorption of less than about 10% at a pressure of 172 millibar (mbar) below atmosphere; Element 43: wherein the foamed thermoplastic vulcanizate composition has a water absorption of less than about 5% at a pressure of 172 millibar (mbar) below atmosphere: Element 44: wherein the foamed thermoplastic vulcanizate composition has a tensile strength at break of about 1 MPa to about 4 MPa; Element 45: wherein the foamed thermoplastic vulcanizate composition has a elongation strength at break of greater than about 150%: Element 46: wherein the foamed thermoplastic vulcanizate composition has a elongation strength at break of greater than about 200% to about 300%; Element 47: wherein the foamed thermoplastic vulcanizate composition has a specific gravity 0.5 to 0.7; Element 48: the foamed thermoplastic vulcanizate composition has a Shore A hardness of 20 Shore A to 90 Shore A: Element 49: wherein the foamed thermoplastic vulcanizate composition has a hardness of from 30 Shore A to 70 Shore A; Element 50: wherein the foamed thermoplastic vulcanizate composition has a tension set at 50% elongation (method 1) of about 20% or less; Element 51: wherein the foamed thermoplastic vulcanizate composition has a tension set at 50% elongation (method 1) of about 15% or less; Element 52: wherein the foamed thermoplastic vulcanizate composition has a tension set at 25% elongation (method 2) of about 12% or less; Element 53: wherein the foamed thermoplastic vulcanizate composition has a tension set at 25% elongation (method 2) of about 10% or less; Element 54: wherein the foamed thermoplastic vulcanizate composition has a tensile stress at 100% strain of about 0.8 MPa or greater; Element 55: wherein the foamed thermoplastic vulcanizate composition has a tensile stress at 100% strain of about 1.2 MPa or greater: Element 56: wherein the foamed thermoplastic vulcanizate composition has a 50% or greater of cells in the foamed thermoplastic vulcanizate composition being closed cell structures; Element 57: wherein the foamed thermoplastic vulcanizate composition has a 70% or greater of cells in the foamed thermoplastic vulcanizate composition being closed cell structures: Element 58: wherein the foamed thermoplastic vulcanizate composition comprises a surface treatment layer; Element 59: wherein the thermoplastic vulcanizate has a Shore A hardness of 20 Shore A to 60 Shore A: Element 60: wherein the thermoplastic vulcanizate has a hardness of from 40 Shore A to 80 Shore A; Element 61: wherein the thermoplastic vulcanizate has a stress relaxation slope of −1 to −5 (1/min) as measured by an Elastocon stress relaxation instrument: Element 62: wherein the thermoplastic vulcanizate has a stress relaxation slope of −2 to −4.5 (1/min) as measured by an Elastocon stress relaxation instrument; Element 63: wherein the thermoplastic vulcanizate has a G' value (@ 90° C., 0.6 rad/s, and 1% strain) of from 600 kPa to 2000 kPa; Element 64: wherein the thermoplastic vulcanizate has a G' value (@, 90° C., 0.6 rad/s, and 1% strain) of from 700 kPa to 1400 kPa; Element 65: wherein the thermoplastic vulcanizate has a tan δ ((@ 90° C., 5 rad/s, and 1% strain) of from 0.3 to 1; Element 66: wherein the thermoplastic vulcanizate has a tan δ (@ 90° C., 5 rad/s, and 1% strain) of from 0.5 to 0.9; Element 67: wherein the thermoplastic vulcanizate has a tan δ (@ 215° C., 5.0 rad/s, and 100% strain) of from 0.25 to 1.0; Element 68: a sealing profile or article further comprising a blend of conjugated diene rubbers; Element 69: a sealing profile or article further comprising unsaturated styrenic triblock copolymer rubber, hydrogenated styrenic triblock copolymer rubber, and ethylene/α-olefin rubber, wherein the ethylene/α-olefin rubber further comprises ethylene/α-olefin non-conjugated diene rubber: Element 70: a sealing profile or article further comprising one or more of a plastomer and a second portion of the ethylene-a-olefin-diene terpolymer elastomer: Element 71: a method for preparation of a sealing profile or article comprising blending the thermoplastic vulcanizate with a thermo-expandable microsphere foaming agent, and extruding the blended thermoplastic vulcanizate and the thermo-expandable microsphere foaming agent at an extrusion temperature to form the foamed thermoplastic vulcanizate composition: Element 72: wherein the extrusion temperature is about 160° C. to about 240° C.; Element 73: wherein the thermo-expandable microsphere foaming agent has a maximum expansion temperature and the thermoplastic vulcanizate has a melt temperature, both within a temperature range of ±40° C. of each other, and wherein the extrusion temperature, the maximum expansion temperature, and the melt temperature are within the temperature range of ±40° C. of each other: Element 74: wherein the blending comprises dry blending, melt blending, or hopper blending: Element 75: a method for preparation of a sealing profile or article comprising injecting the thermoplastic vulcanizate with a supercritical gas to form a mixture, and injection molding the mixture to form the sealing profile or article; Element 76: a method for preparation of a sealing profile or article wherein the foamed thermoplastic vulcanizate composition is extruded and foamed by a robotic extrusion process; Element 77: comprising applying a surface treatment layer: Element 78: wherein the surface treatment layer is applied by co-extrusion, painting, spraying, or sputtering; Element 79: wherein the sealing profile or article is shaped to serve as a weather seal article in an automotive vehicle: Element 80: wherein the sealing profile or article is shaped as a secondary and a primary door seal coupled to a perimeter of an automotive vehicle door; Element 81: wherein the sealing profile or article is shaped as a rocker seal used to seal an underbody with a foot well of a motor vehicle; Element 82: wherein the sealing profile or article is shaped as a liftgate seal configured to provide a functional seal used to couple a back hatch with a flip glass seal positioned against a liftable rear glass window in an automotive vehicle; and Element 83: wherein the sealing profile or article is shaped to serve as a window seal, primary door seal, a secondary door seal, a body seal, a door panel, a trunk seal, a rocker seal, or a hood seal.

Examples of combinations include, but are not limited to, one or more of Elements 1-6, 9-11, 15-16, 18-35, 41-71, 75-76, and 79-83 in combination with one or more of Elements 1-6, 9-11, 15-16, 18-35, 41-71, 75-76, and 79-83; Element 7 in combination with one or more of Elements 1-6, 8-11, 15-16, 18-35, 41-71, 75-76, and 79-83; Element 8 in combination with one or more of Elements 1-6, 9-11, 15-16, 18-35, 41-71, 75-76, and 79-83; Element 12 in combination with one or more of Elements 11, 15-16, 18-35, 41-71, 75-76, and 79-83; Element 13 in combination with one or more of Elements 11, 15-16, 18-35, 41-71, 75-76, and 79-83; Element 14 in combination with one or more of Elements 11, 15-16, 18-35, 41-71, 75-76, and 79-83: Element 17 in combination with one or more of Elements 16, 18-35, 41-71, 75-76, and 79-83; Element 36 in combination with one or more of Elements 34, 41-71, 75-76, and 79-83; Element 37 in combination with one or more of Elements 34, 36, 41-71, 75-76, and 79-83: Element 38 in combination with one or more of Elements 37,41-71, 75-76, and 79-83; Element 39 in combination with one or more of Elements 37-38, 41-71, 75-76, and 79-83; Element 40 in combination with one or more of Elements 37-38, 41-71, 75-76, and 79-83; Element 72 in combination with one or more of Elements 71, 75-76, and 79-83; Element 73 in combination with one or more of Elements 71-72, 75-76, and 79-83: Element 74 in combination with one or more of Elements 71-73, 75-76, and 79-83: and Element 77 in combination with one or more of Elements 71-76, 79-83; Element 78 in combination with one or more of Elements 77, 79-83.

EXPERIMENTAL

TPV Sample Preparation Using a Twin Screw Extruder (TSE)

The following description explains the process employed in the following samples unless otherwise specified. A co-rotating, fully intermeshing type twin screw extruder, supplied by Coperion Corporation. Ramsey N.J., was used following a method similar to that described in U.S. Pat. No. 4,594,391 and U.S. Pat. App. Pub. No. 2011/0028637 (excepting those altered conditions identified here). EPDM was fed into the feed throat of a ZSK 53 extruder of L/D (length of extruder over its diameter) of about 44. The thermoplastic resin (polypropylene) was also fed into the feed throat along with other reaction rate control agents such as zinc oxide and stannous chloride. Fillers, such as clay and black MB, were also added into the extruder feed throat. Process oil was injected into the extruder at two different locations along the extruder. The curative was injected into the extruder after the rubber, thermoplastics and fillers commenced blending at about an L/D of 18.7, but after the introduction of first process oil (pre-cure oil) at about an L/D of 6.5. In some examples, the curative was injected with the process oil, which oil may or may not have been the same as the other oil introduced to the extruder or the oil the rubber was extended with. The second process oil (post-cure oil) was injected into the extruder after the curative injection at about an L/D of 26.8. Rubber crosslinking reactions were initiated and controlled by balancing a combination of viscous heat generation due to application of shear, barrel temperature set point, use of catalysts, and residence time.

The extruded materials were fed into the extruder at a rate of 70 kg/hr and the extrusion mixing was carried out at 325 revolutions per minute (RPM), unless specified. A barrel metal temperature profile in ° C., starting from barrel section 2 down towards the die to barrel section 12 of 160/160/160/160/165/165/165/180/180/180/180° C. (wherein the last value is for the die) was used. Low molecular weight contaminants, reaction by-products, residual moisture and the like were removed by venting through one or more vent ports, typically under vacuum, as needed. The final product was filtered using a melt gear pump and a filter screen of desired mesh size. A screw design with several mixing sections including a combination of forward convey, neutral, left handed kneading blocks and left handed convey elements to mix the process oil, cure agents and provide sufficient residence time and shear for completing the cure reaction, without slip or surging in the extruder, were used.

The TPV formulations were prepared in pellet form as described in Table 4.

TABLE 4

| Formulation | A | B | C | D | E | F |
|---|---|---|---|---|---|---|
| VISTALON ™ 3666 (phr) | 175 | 175 | | | | |
| KELTAN ™ 5469Q (phr) | | | 200 | 200 | 200 | |
| EXXONMOBIL ™ PP5341 (phr) | 26.97 | 26.97 | 26.51 | | | |
| PDH025 (phr) | | | | 26.97 | 26.51 | |
| Carbon black MB (phr) | 23.96 | 23.96 | 23.96 | 23.96 | 23.96 | |
| Clay (phr) | 42 | 42 | 42 | 42 | 42 | |
| ZnO (phr) | 1.50 | 1.50 | 1.50 | 1.50 | 1.50 | |
| SUNPAR ™ 150M (phr) | 68.82 | | | | | |
| PARAMOUNT ™ 6001R (phr) | | 68.82 | 41.18 | 68.82 | 41.18 | |
| SnCl$_2$-45% MB (phr) | 1.67 | 1.67 | 2.51 | 1.67 | 2.51 | |
| Phenolic curative (phr) | 7.56 | 7.56 | 11.34 | 7.56 | 11.34 | |
| 121-67W175 (phr) | | | | | | 100 |
| Total phr of oil | 149.11 | 149.11 | 149.11 | 174.11 | 149.11 | |
| Total (phr) | 347.48 | 347.48 | 348.99 | 372.48 | 348.99 | 100 |

Carbon black MB is AMPACET ™ 49974 carbon black masterbatch available from Ampacet Corp.
Clay is ICECAP ™ K Clay available from Burgess.
SUNPAR ™ 150M is a paraffinic oil available from Sunco.
PARAMOUNT ™ 6001R is a paraffinic oil available from ChevronPhillips.
"SnCl$_2$-45 wt % MB" is an anhydrous stannous chloride polypropylene masterbatch. The SnCl$_2$ MB contains 45 wt % stannous chloride and 55 wt % of polypropylene having an MFR of 0.8 g/10 min (ASTM D1238-13; 230° C. and 2.16 kg weight).
The phenolic curative (a phenolic resin in oil, 30 wt % phenolic resin and 70 wt % oil) was a resole-type resin obtained from Schenectady International.
121-67W175 is a commercial TPV under brand name SANTOPRENE ™ with a hardness of 67 Shore A.

TPV Foamed Strip Sample Preparation

Foamed thermoplastic vulcanizate tapes were prepared on a 1.5" single screw Davis-Standard extruder using a slit die of approximate dimensions 1.097" (width)×0.078" (thickness). The extruder I/D is 24, and the extruder has 4 heating zones. No screen pack was used in any of the experiments.

GPC 4D Procedure: Molecular Weight, Comonomer Composition and Long Chain Branching Determination by GPC-IR Hyphenated with Multiple Detectors Unless otherwise indicated, the distribution and the moments of molecular weight (Mw, Mn, Mw/Mn, etc.), the comonomer content ($C_2$, $C_3$, $C_6$, etc.) and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 μm Teflon filter and degassed with an online degasser before entering the GPC instrument. The nominal flow rate is 1.0 ml/min and the nominal injection volume is 200 μL. The whole system including transfer lines, columns, and detectors are contained in an oven maintained at 145° C. The polymer sample is weighed and sealed in a standard vial with 80 μL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hours for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (1), using the following equation: $c=\beta I$, where $\beta$ is the mass constant. The mass recovery is calculated from the ratio of the integrated area of the concentration chromatography over elution volume and the injection mass which is equal to the pre-determined concentration multiplied by injection loop volume. The conventional molecular weight (IR MW) is determined by combining the universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $\alpha PS=0.67$ and $KPS=0.000175$ while $\alpha$ and K are for other materials as calculated and published in literature (Sun, T. et al., *Macromolecules*, 2001, 34, 6812), except that for purposes of the present disclosure, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butene polymers, $\alpha$ is 0.695 and K is $0.000579*(1-0.0087*w2b+0.000018*(w2b)^2)$ for ethylene-butene copolymer where w2b is a bulk weight percent of butene comonomer, a is 0.695 and K is $0.000579*(1-0.0075*w2b)$ for ethylene-hexene copolymer where w2b is a bulk weight percent of hexene comonomer, and $\alpha$ is 0.695 and K is $0.000579*(1-0.0077*w2b)$ for ethylene-octene copolymer where w2b is a bulk weight percent of octene comonomer. Concentrations are expressed in $g/cm^3$, molecular weight is expressed in g/mole, and intrinsic viscosity (hence K in the Mark-Houwink equation) is expressed in dL/g unless otherwise noted.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system. The refractive index, $n=1.500$ for TCB at 145° C. and $\lambda=665$ nm. For analyzing polyethylene homopolymers, ethylene-hexene copolymers, and ethylene-octene copolymers, $dn/dc=0.1048$ ml/mg and $A_2=0.0015$: for analyzing ethylene-butene copolymers, $dn/dc=0.1048*(1-0.00126*w2)$ ml/mg and $A_2=0.0015$ where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the equation $[\eta]=\eta_s/c$, where c is concentration and is determined from the IR5 broadband channel output. The viscosity MW at each point is calculated as $$M = K_{PS} M^{\alpha_{ps}+1}/[\eta],$$

where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\Sigma c_i [\eta]_i}{\Sigma c_i}$$

where the summations are over the chromatographic slices, i, between the integration limits.

The branching index $g'_{vis}$ is defined as:

$$g'_{vis} = \frac{[\eta]_{avg}}{K M_v^\alpha}$$

where $M_V$ is the viscosity-average molecular weight based on molecular weights determined by LS analysis and the K and $\alpha$ are for the reference linear polymer, which are, for purposes of the present disclosure. $\alpha=0.700$ and $K=0.0003931$ for ethylene, propylene, diene monomer copolymers, $\alpha=0.695$ and $K=0.000579$ for linear ethylene polymers, $\alpha=0.705$ and $K=0.0002288$ for linear propylene polymers, $\alpha=0.695$ and $K=0.000181$ for linear butene polymers, $\alpha$ is 0.695 and K is $0.000579*(1-0.0087*w2b+0.000018*(w2b)^2)$ for ethylene-butene copolymer where w2b is a bulk weight percent of butene comonomer, $\alpha$ is 0.695 and K is $0.000579*(1-0.0075*w2b)$ for ethylene-hexene copolymer where w2b is a bulk weight percent of hexene comonomer, and $\alpha$ is 0.695 and K is $0.000579*(1-0.0077*w2b)$ for ethylene-octene copolymer where w2b is a bulk weight percent of octene comonomer. Concentrations are expressed in $g/cm^3$, molecular weight is expressed in g/mole, and intrinsic viscosity (hence K in the Mark-Houwink equation) is expressed in dL/g unless otherwise noted. Calculation of the w2b values is as discussed above.

In some embodiments, the high viscosity, long-chain branched polyolefins employed in the present disclosure are prepared by converting solid, high molecular weight, linear, propylene polymer material with irradiating energy as disclosed in U.S. Pat. No. 5,414,027, which is incorporated herein by reference for purpose of U.S. patent practice.

Other techniques include treatment of linear polymer with heat and peroxide as disclosed in U.S. Pat. No. 5,047,485, which is incorporated herein by reference for purpose of U.S. patent practice. Other useful high viscosity, long-chain branched polyolefins are disclosed in U.S. Pat. Nos. 4,916,198, 5,047,446, 5,570,595, and European Publication Nos. 0 190 889, 0 384 431, 0 351 866, and 0 634 441, which are also incorporated herein by reference for purpose of U.S. patent practice.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (*Macromolecules*, 2001, Vol. 34(19), pp. 6812-6820).

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1000 total carbons ($CH_3/1000TC$) as a function of molecular weight. The short-chain branch (SCB) content per 1000TC (SCB/1000TC) is then computed as a function of molecular weight by applying a chain-end correction to the $CH_3/1000TC$ function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively.

$$w2 = f * SCB/1000TC$$

The bulk composition of the polymer from the GPC-IR and GPC-4D analyses is obtained by considering the entire signals of the CH3 and CH2 channels between the integration limits of the concentration chromatogram. First, the following ratio is obtained.

$$\text{Bulk } IR \text{ ratio} = \frac{\text{Area of } CH_3 \text{ signal within integration limits}}{\text{Area of } CH_2 \text{ signal within integration limits}}$$

Then the same calibration of the $CH_3$ and $CH_2$ signal ratio, as mentioned previously in obtaining the CH3/1000TC as a function of molecular weight, is applied to obtain the bulk CH3/1000TC. A bulk methyl chain ends per 1000TC (bulk CH3end/1000TC) is obtained by weight-averaging the chain-end correction over the molecular-weight range. Then $$w2b = f * \text{bulk } CH3/1000TC$$

$$\text{bulk } SCB/1000TC = \text{bulk } CH3/1000TC - \text{bulk} \frac{CH3end}{1000TC}$$

and bulk SCB/1000TC is converted to bulk w2 in the same manner as described above.

Phase Angle and $\Delta\delta$ from Small Amplitude Oscillatory Shear (SAOS)

The rheological measurement properties of the EPDMs were measured by small amplitude oscillatory shear (SAOS) measurements. The SAOS measurements were completed on an Alpha Technologies ATD1000 using 25 mm parallel plates with a gap of 2.5 mm. The EPDM samples were prepared by drying in a vacuum oven at a temperature of 60° C. for 8 h. A 5 gram quantity material was placed between two 0.001" polyester sheets (Alpha part #F0141) to prevent the samples from sticking to the parallel plate fixture. The material was allowed to melt for 30 s prior to closing the fixture. The first shear measurement was made after 4.5 min of clamping inside the fixture. The dynamic properties of the polymer were characterized in the frequency range from 0.1 rad/s to 256 rad/s (logarithmic scaling). The applied stresses and deformations are within the limits of linear viscoelasticity. The oscillatory measurements were used to measure phase angle S as a function of frequency. The Aδ parameter is defined as the difference between the phase angle (S) at frequencies of 0.1 and 128 rad/s, as derived from a frequency sweep at 125° C.

The non-linear rheological measurements properties of the EPDMs were measured by large amplitude oscillatory shear (LAOS) measurements. The LAOS measurements were completed on an Alpha Technologies ATD1000 using 25 mm parallel plates with a gap of 2.5 mm. The EPDM samples were prepared by drying in a vacuum oven at a temperature of 60° C. for 8 h. A 5 gram quantity material was placed between two 0.001" polyester sheets (Alpha part #F0141) to prevent the samples from sticking to the parallel plate fixture. The material was allowed to melt for 30 s prior to closing the fixture. The first shear measurement was made after 4.5 min of clamping inside the fixture. The large amplitude oscillatory properties of the polymer was characterized using a frequency of 0.63 rad/s and strain amplitude of 1000%. The storage modulus associated with different modes or harmonic can be extracted by using a Fourier transformation of the stress-strain curves, e.g. see Hyun et al., "A review of nonlinear oscillatory shear tests: Analysis and application of large amplitude oscillatory shear (LAOS), Progress in Polymer Science, Vol. 36, Issue 12, pp. 1697-1753, 2011." The corresponding storage modulus associated with each harmonic can be defined as $G'_1$, $G'_2$, $G'_3$, etc. The LAOS measurements were used to measure first, third and fifth harmonics. The LAOS branching index (BI) is defined as [T. Rauschumann, "Linear and Non Linear Rheological Measurements on Rubber Polymers and Compounds", presentation given at Innovations in Rubber Design Conference (organized by Rubber in Engineering Group), Hamilton Pl. London WIJ 7BQ, Dec. 6-7, 2016]:

$$BI = \frac{G_1}{G_5} - E_3$$

$$E_3 = \frac{5}{4} + \frac{1}{4}\left(\frac{G'_3}{G'_5}\right)^2 - \frac{1}{2}\left(\frac{G'_3}{G'_5}\right)$$

where $G_1$ corresponds to $1^{st}$ harmonic storage modulus, $G_3$ the $2^{nd}$ harmonic storage modulus, and $G'_5$ the $3^{rd}$ harmonic storage modulus.

Shore A Hardness was measured using a Zwick automated durometer according to ASTM D2240-15e1 (15 sec. delay). Shore D Hardness was measured using a Zwick automated durometer according to ASTM D2240-15e1.

Ultimate tensile strength ("UTS"), modulus at 100% extension ("M100"), and ultimate elongation ("UE") were measured on injection molded plaques according to ASTM D412-16 at 23° C. (unless otherwise specified) at 50 mm per minute by using an Instron testing machine.

The Tension Set (Method 1) was measured at 70° C. and for 22 h by applying a 50% Strain. The samples are taken out under tension and allowed to cool for 2 h. The measurements are performed 30 min after releasing from tension.

The tension set (Method 2) was measured at 70° C. and for 22 h by applying a 25% strain. The measurements are performed 30 min after releasing from tension.

The compression set was measured at 70° C. and for 94 h by applying a 50% deflection on a 3 layer plied stack. The samples are taken out under compression and allowed to cool for 3 h under compression. The measurements are performed within 5 s after releasing from compression.

Rheological properties of the TPVs were measured by small angle oscillatory shear measurements. The SAOS measurements were completed on an Alpha Technologies ATD 1000 using serrated 25 mm parallel plates with a gap of 2.5 mm. The TPV samples were prepared for the test by placing the sample in a vacuum oven at a temperature between 60° C. and 70° C. for between 8 and 12 hours prior to analysis. 5 gram quantities of the material were then placed between two 0.001" polyester sheets (Alpha part #F0141) to prevent the samples from sticking to the parallel plate fixture. The material was allowed to melt for 30 seconds prior to closing the fixture. The first shear measurement was made after 4.5 minutes of clamping inside the fixture. Bulk Modulus components and shear viscosity components from each run were calculated by the machine software (Workbench v 5.70 published by Alpha Technologies). The G' was measured at 1% strain, 0.6 rad/s, 90° C. Tan Delta was measured at 1% strain, 0.6 rad/s, 90° C.

Extrusion surface roughness ("ESR") in micro inches was measured as follows: approximately 1 kg (2 lbs.) of the TPV to be tested was fed into a 1" or 1.5" diameter extruder (Davis-Standard) equipped with a 24:1 L/D screw having a 3.0 to 3.5 compression ratio. The extruder was fitted with a strip die 25.4 mm (1") wide×0.5 mm (0.019") thick×7 to 10 mm (0.25 to 0.40") length. A breaker plate was used with the die, but no screen pack was placed in front of the breaker plate. Temperature profiles of the extruder were as follows: Zone 1=180° C. (feed Zone); Zone 2=190° C. (feed Zone); Zone 3=200° C. (feed Zone); Zone 4=205° C. (die Zone). When the zone temperatures were reached, the screw was activated. Screw speed was set to maintain an output of approximately 50 grams per minute during material purging. For the first 5 minutes of extrusion the extruder was flushed and the extruded material was discarded. A strip approximately 30.5 cm (12") in length was extruded on a flat substrate placed directly under and touching the underside of the die. Three representative samples were collected in this manner and ESR was measured on the samples using a model EMD-04000 W5 Surfanalyzer System 4000 including a universal probe 200 mg stylus force and a Surfanalyzer proper tip type EPT-01049 (0.025 mm (0.0001") stylus radius).

Total surface spots was measured as follows: approximately 1 kg (2 lbs.) of the TPV to be tested was fed into a 1" or 1.5" diameter extruder. The extruder was fitted with a strip die 25.4 mm (1") wide×0.5 mm (0.019") thick×7 to 10 mm (0.25 to 0.40") length. Temperature profiles of the extruder were as follows: Zone 1=180° C. (feed Zone); Zone 2=190° C. (feed Zone); Zone 3=200° C. (feed Zone); Zone 4=205° C. (die Zone). Three representative samples were collected in this manner and total surface spots was measured on the samples by visually examining and counting surface spots using a 100 watt illumination with 1.75 power magnification. Average number of total surface spots greater than 0.8 mm$^2$ was determined according to the TAPPI chart.

Stress relaxation slope was measured in compression according to ISO 3384A using an Elastocon stress relaxation tester. The samples are plied up to 2 mm thickness and compressed to 10% deflection at 70° C. and for 24 h. A plot of normalized force (normalized with respect to force @ t=0.01 s) as a function of time was constructed. The slope of this plot is defined as stress relaxation slope and has units of 1/min.

The weight gain % was measured according to ASTM D471-16a for 24 h and at 121° C. using IRM903 oil.

In order to demonstrate the practice of the present disclosure, the following examples have been prepared and tested. The examples should not, however, be viewed as limiting the scope of the present disclosure.

EXAMPLES

Preparation of the examples and comparatives are provided above. Compositions A, B, and F are comparative TPs, and Compositions C, D, E are inventive TPVs. Table 5 provides the foamed compositions and respective properties.

The inventive TPV compositions C, D, E demonstrate significantly reduced tension by up to 50% relative to conventional TPVs A, B made with VISTALON™ 3666 at SG range of 0.6-0.7 on foamed strips and similar (D) or higher hardness and tensile properties (C, E). Due to the closed cell foam structure of the thermos-expandable microcapsules, the foamed inventive TPV profiles should have very low water absorption which is advantageous for primary body and door seals for automobile vehicles and trunks.

The 1.5" Davis-Standard screw extruder temperature profiles were as follows. For examples CEx1-CEx4, CEx6 and Ex8, Ex10, Ex12, Ex13, the extruder set temperature profile was: 290-320-340-350-370 F (the latter being the set die temperature). For examples CEx5, CEx7, Ex9, Ex11, Ex14, the extruder set temperature profile was 280-310-330-340-340-360 F (the latter being the set die temperature).

TABLE 5

| Example | CEx1 | CEx2 | CEx3 | CEx4 | CEx5 | CEx6 | CEx7 | Ex8 | Ex9 | Ex10 | Ex11 | Ex12 | Ex13 | Ex14 |
|---|---|---|---|---|---|---|---|---|---|---|---|---|---|---|
| TPV composition | A | A | B | B | B | F | F | C | C | D | D | E | E | E |
| Expancel 950MB80 wt % | 0 | 1.5 | 0 | 1.5 | 1.5 | 0 | 1.5 | 0 | 1.5 | 0 | 1.5 | 0 | 1.5 | 1.5 |
| Die Temperature (° F.) | 369 | 369 | 369 | 369 | 360 | 371 | 360 | 370 | 360 | 371 | 360 | 370 | 370 | 360 |
| Specific gravity | 0.990 | 0.640 | 0.977 | 0.678 | 0.646 | 0.980 | 0.658 | 0.959 | 0.714 | 0.967 | 0.696 | 0.958 | 0.638 | 0.658 |
| Tension set (Method 2) | 9.8 | 13.8 | 11.2 | 14.8 | 15.2 | 10.3 | 12.8 | 7.0 | 9.2 | 6.5 | 8.8 | 6.8 | 10 | 10 |
| Tension set (Method 1) | 19.2 | 25.5 | 22.2 | 27.2 | 28.5 | 19.2 | 23.7 | 11.2 | 14.3 | 11.0 | 13.8 | 11.2 | 16.8 | 15.7 |
| Young's Modulus MPa | 3.9 | 4.5 | 4.1 | 4.2 | 4.7 | 6.2 | 7.7 | 3.1 | 4.4 | 3.1 | 3.7 | 2.2 | 3.0 | 3.0 |

TABLE 5-continued

| Example | CEx1 | CEx2 | CEx3 | CEx4 | CEx5 | CEx6 | CEx7 | Ex8 | Ex9 | Ex10 | Ex11 | Ex12 | Ex13 | Ex14 |
|---|---|---|---|---|---|---|---|---|---|---|---|---|---|---|
| Elongation to break % | 314 | 207 | 273 | 185 | 157 | 405 | 207 | 359 | 237 | 319 | 236 | 312 | 210 | 206 |
| Stress @ 100%, MPa | 2.0 | 1.2 | 1.9 | 1.2 | 1.3 | 2.8 | 1.9 | 2.3 | 1.7 | 2.2 | 1.4 | 1.7 | 1.0 | 1.2 |
| Tensile strength at break, MPa | 4.3 | 1.8 | 3.6 | 1.7 | 1.5 | 6.3 | 2.6 | 5.8 | 2.9 | 5.4 | 2.6 | 4.4 | 1.7 | 1.9 |
| Water absorption @ 17 mbar | | | 0.0 | 0.2 | | 0.0 | 0.0 | | | 0.0 | 0.1 | 0.1 | 0.0 | |

All documents described herein are incorporated by reference herein, including any priority documents and/or testing procedures to the extent they are not inconsistent with this text. As is apparent from the foregoing general description and the specific embodiments, while forms of the embodiments have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "1" preceding the recitation of the composition, element, or elements and vice versa, e.g., the terms "comprising," "consisting essentially of," "consisting of" also include the product of the combinations of elements listed after the term.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present disclosure. Further, all documents and references cited herein, including testing procedures, publications, patents, journal articles, etc. are herein fully incorporated by reference for all jurisdictions in which such incorporation is permitted and to the extent such disclosure is consistent with the description of the present disclosure.

While the present disclosure has been described with respect to a number of embodiments and examples, those skilled in the art, having benefit of the present disclosure, will appreciate that other embodiments can be devised which do not depart from the scope and spirit of the present disclosure as described herein.

What is claimed is:

1. A sealing profile or article comprising:
a foamed thermoplastic vulcanizate composition comprising:
a thermoplastic polyolefin; and
an ethylene-a-olefin-diene terpolymer elastomer having: a weight-average molecular weight Mw of from 200,000 g/mol to 3,000,000 g/mol, a Mw/Mn of 4.0 or lower, and a $g'_{vis}$ of 0.90 or greater, wherein the foamed thermoplastic vulcanizate composition has a specific gravity of 0.2 to 0.9, and
wherein the foamed thermoplastic vulcanizate composition is formed by foaming a thermoplastic vulcanizate comprising the thermoplastic polyolefin and the ethylene-a-olefin-diene terpolymer elastomer with a thermoexpandable microsphere foaming agent having a maximum expansion temperature within a temperature range of +/−40° C. of a melt temperature of the thermoplastic vulcanizate.

2. The sealing profile or article of claim 1, wherein the ethylene-a-olefin-diene terpolymer elastomer has a Δδ of from 30° to 80° from small amplitude oscillatory shear (SAOS), where Δδ=δ (0.1 rad/s)−δ (128 rad/s), or a large amplitude oscillatory shear (LAOS) branching index of less than 3.0.

3. The sealing profile or article of claim 1, wherein the thermoplastic polyolefin comprises a polypropylene.

4. The sealing profile or article of claim 1, wherein the ethylene-a-olefin-diene terpolymer elastomer comprises ethylene-propylene-diene terpolymer, an ethylene-butene-diene terpolymer, an ethylene-octene-diene terpolymer, or combinations thereof.

5. The sealing profile or article of claim 1, further comprising a curative system, wherein the curative system comprises a curative, wherein the curative comprises a phenolic resin, a peroxide, a maleimide, a silicon-based curative, a silane-based curative system, sulfur-based cure system, or any combination thereof.

6. The sealing profile or article of claim 1, wherein the ethylene-a-olefin-diene terpolymer elastomer has a Mw of from 400,000 g/mol to 1,000,000 g/mol.

7. The sealing profile or article of claim 1, wherein the ethylene-a-olefin-diene terpolymer elastomer has a Mw/Mn of 3.0 or lower.

8. The sealing profile or article of claim 1, wherein the ethylene-a-olefin-diene terpolymer elastomer has a $g'_{vis}$ of 0.95 or greater.

9. The sealing profile or article of claim 1, wherein the ethylene-a-olefin-diene terpolymer elastomer comprises an ethylene content of 50 wt % to 70 wt % and a diene content of 4 wt % to 12 wt %, each based on a total weight of the ethylene-a-olefin-diene terpolymer elastomer.

10. The sealing profile or article of claim 1, wherein the diene of the ethylene-a-olefin-diene terpolymer elastomer comprises 5-ethylidene-2-norbornene (ENB), 5-vinyl-2-norbornene (VNB), or any combination thereof.

11. The sealing profile or article of claim 1, wherein the ethylene-a-olefin-diene terpolymer elastomer has a dry Mooney Viscosity ($ML_{1+4}$@ 125° C.) of 200 MU or greater.

12. The sealing profile or article of claim 1, wherein the ethylene-a-olefin-diene terpolymer elastomer is oil extended with an oil having 50 phr to 200 phr based on 100 phr of the ethylene-a-olefin-diene terpolymer elastomer.

13. The sealing profile or article of claim 1, wherein the thermoplastic polyolefin is one or more of a homopolymer, random, or impact copolymer polypropylene having:
   a melt mass flow rate (ASTM D1238-13; 230° C.; 2.16 kg) of from 0.1 g/10 min to 50 g/10 min; and
   a Mw of from 100,000 g/mol to 1,000,000 g/mol.

14. The sealing profile or article of claim 1, wherein the thermoplastic polyolefin is one or more of a homopolymer, random, or impact copolymer polypropylene having:
   a melt mass flow rate (ASTM D1238-13; 230° C.; 2.16 kg) of from 0.5 g/10 min to 5 g/10 min;
   a Mw of from 400,000 g/mol to 800,000 g/mol; and
   a $g'_{vis}$ of 0.90 or less.

15. The sealing profile of claim 1, wherein the thermoexpandable microsphere foaming agent is present in an amount of about 0.5% to about 5% by weight of the foamed thermoplastic vulcanizate composition.

16. The sealing profile of claim 1, wherein the foamed thermoplastic vulcanizate composition has a water absorption of less than about 20% at a pressure of 172 millibar (mbar) below atmosphere.

17. The sealing profile of claim 1, wherein the foamed thermoplastic vulcanizate composition has a tensile strength at break of about 1 MPa to about 4 MPa.

18. The sealing profile of claim 1, wherein the foamed thermoplastic vulcanizate composition has a elongation strength at break of greater than about 150%.

19. The sealing profile of claim 1, wherein the foamed thermoplastic vulcanizate composition has a specific gravity 0.5 to 0.7.

20. The sealing profile of claim 1, wherein the foamed thermoplastic vulcanizate composition has a Shore A hardness of 20 Shore A to 90 Shore A.

21. The sealing profile of claim 1, wherein the foamed thermoplastic vulcanizate composition has a tension set at 50% elongation (method 1) of about 20% or less.

22. The sealing profile of claim 1, wherein the foamed thermoplastic vulcanizate composition has a tension set at 25% elongation (method 2) of about 12% or less.

23. The sealing profile of claim 1, wherein the foamed thermoplastic vulcanizate composition has a tensile stress at 100% strain of about 0.8 MPa or greater.

24. The sealing profile of claim 1, wherein the foamed thermoplastic vulcanizate composition has a closed cell content greater than at least 50%.

25. The sealing profile of claim 1, wherein the foamed thermoplastic vulcanizate composition has a closed cell content greater than at least 80%.

\* \* \* \* \*